United States Patent
Komamiya et al.

(10) Patent No.: US 10,115,042 B2
(45) Date of Patent: Oct. 30, 2018

(54) IMAGE PROCESSING APPARATUS AND IMAGE PROCESSING METHOD

(71) Applicant: CANON KABUSHIKI KAISHA, Tokyo (JP)

(72) Inventors: Eiji Komamiya, Kawasaki (JP); Yasunori Fujimoto, Inagi (JP); Satoshi Hayashi, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 250 days.

(21) Appl. No.: 15/048,846

(22) Filed: Feb. 19, 2016

(65) Prior Publication Data

US 2016/0243848 A1   Aug. 25, 2016

(30) Foreign Application Priority Data

Feb. 24, 2015  (JP) ................................ 2015-034515

(51) Int. Cl.
*G06K 15/02*  (2006.01)
*B41J 2/21*  (2006.01)
*G06K 15/10*  (2006.01)

(52) U.S. Cl.
CPC ........ *G06K 15/1848* (2013.01); *B41J 2/2132* (2013.01); *G06K 15/107* (2013.01)

(58) Field of Classification Search
None
See application file for complete search history.

(56) References Cited

U.S. PATENT DOCUMENTS

2009/0161165 A1\* 6/2009 Fujimoto ............ G06K 15/107
                                                              358/2.1
2012/0044526 A1\* 2/2012 Miyazaki ............... B41J 2/2132
                                                            358/1.15

FOREIGN PATENT DOCUMENTS

JP        2003-175592 A        6/2003
JP        2010-000666 A        1/2010

\* cited by examiner

*Primary Examiner* — John R Wallace
(74) *Attorney, Agent, or Firm* — Canon U.S.A., Inc. IP Divison

(57) ABSTRACT

When ink is discharged more than once to one pixel area, the ink is discharged without focusing on specific scans among a plurality of scans if the attribute in an image is a first attribute, and the ink is discharged intensively in specific scans among the plurality of scans if the attribute in the image is a second attribute.

36 Claims, 25 Drawing Sheets

*FIG. 6A*

| 700 | 701 | 702 | 703 |
|---|---|---|---|
| 704 | 705 | 706 | 707 |
| 708 | 709 | 710 | 711 |
| 712 | 713 | 714 | 715 |

*FIG. 6B*

| 00 | 00 | 00 | 00 |
|---|---|---|---|
| 01 | 01 | 01 | 01 |
| 10 | 10 | 10 | 10 |
| 11 | 11 | 11 | 11 |

*FIG. 6C-1* (505)

| 00 | 01 | 10 | 11 |
|---|---|---|---|
| 01 | 00 | 11 | 10 |
| 10 | 11 | 00 | 01 |
| 11 | 10 | 01 | 00 |

*FIG. 6C-2* (506)

| 01 | 00 | 11 | 10 |
|---|---|---|---|
| 00 | 01 | 10 | 11 |
| 11 | 10 | 01 | 00 |
| 10 | 11 | 00 | 01 |

*FIG. 6C-3* (507)

| 10 | 11 | 00 | 01 |
|---|---|---|---|
| 11 | 10 | 01 | 00 |
| 00 | 01 | 10 | 11 |
| 01 | 00 | 11 | 10 |

*FIG. 6C-4* (508)

| 11 | 10 | 01 | 00 |
|---|---|---|---|
| 10 | 11 | 00 | 01 |
| 01 | 00 | 11 | 10 |
| 00 | 01 | 10 | 11 |

*FIG. 6D-1*

| 0 | 0 | 0 | 0 |
|---|---|---|---|
| 0 | 0 | 1 | 1 |
| 1 | 0 | 0 | 1 |
| 1 | 1 | 0 | 1 |

*FIG. 6D-2*

| 0 | 0 | 0 | 0 |
|---|---|---|---|
| 0 | 0 | 1 | 1 |
| 1 | 1 | 0 | 0 |
| 0 | 1 | 1 | 1 |

*FIG. 6D-3*

| 0 | 0 | 0 | 0 |
|---|---|---|---|
| 1 | 0 | 0 | 0 |
| 0 | 1 | 1 | 1 |
| 1 | 1 | 1 | 0 |

*FIG. 6D-4*

| 0 | 0 | 0 | 0 |
|---|---|---|---|
| 1 | 1 | 0 | 0 |
| 1 | 0 | 1 | 0 |
| 0 | 1 | 1 | 1 |

*FIG. 6E*

| 0 | 1 | 2 | 3 |
|---|---|---|---|
| 0 | 1 | 2 | 3 |
| 0 | 1 | 2 | 3 |
| 0 | 1 | 2 | 3 |

*FIG. 7*

| ○: PRINT PERMITTING  ×: PRINT NON-PERMITTING | | MASK DATA | | | |
|---|---|---|---|---|---|
| | | 00 | 01 | 10 | 11 |
| IMAGE DATA | 00 | × | × | × | × |
| | 01 | × | × | × | ○ |
| | 10 | × | × | ○ | ○ |
| | 11 | × | ○ | ○ | ○ |

FIG. 9

| INPUT DATA | | | ATTRIBUTE | PASS FOR GENERATING PRINT DATA | | | | | | | | | | |
|---|---|---|---|---|---|---|---|---|---|---|---|---|---|---|
| R | G | B | | Y | M | Pm | C | Pc | K | Gy | Pgy | R | B | P |
| 0 | 0 | 0 | B | 1-6 | 1-6 | 7-12 | 1-6 | 7-12 | 1-6 | 1-6 | 7-12 | 1-6 | 1-6 | 7-12 |
| 0 | 0 | 1 | B | 1-6 | 1-6 | 7-12 | 1-6 | 7-12 | 1-6 | 1-6 | 7-12 | 1-6 | 1-6 | 7-12 |
| 0 | 1 | 0 | B | 1-6 | 1-6 | 7-12 | 1-6 | 7-12 | 1-6 | 1-6 | 7-12 | 1-6 | 1-6 | 7-12 |
| 0 | 1 | 1 | B | 1-6 | 1-6 | 7-12 | 1-6 | 7-12 | 1-6 | 1-6 | 7-12 | 1-6 | 1-6 | 7-12 |
| 1 | 0 | 1 | B | 1-6 | 1-6 | 7-12 | 1-6 | 7-12 | 1-6 | 1-6 | 7-12 | 1-6 | 1-6 | 7-12 |
| 1 | 1 | 1 | B | 1-6 | 1-6 | 7-12 | 1-6 | 7-12 | 1-6 | 1-6 | 7-12 | 1-6 | 1-6 | 7-12 |
| 255 | 255 | 254 | A | 1-12 | 1-12 | 1-12 | 1-12 | 1-12 | 1-12 | 1-12 | 1-12 | 1-12 | 1-12 | 1-12 |
| 255 | 254 | 255 | A | 1-12 | 1-12 | 1-12 | 1-12 | 1-12 | 1-12 | 1-12 | 1-12 | 1-12 | 1-12 | 1-12 |
| 254 | 255 | 255 | A | 1-12 | 1-12 | 1-12 | 1-12 | 1-12 | 1-12 | 1-12 | 1-12 | 1-12 | 1-12 | 1-12 |

FIG. 11A

| 0001 | 0000 | 0000 | 0000 | 0000 | 0000 |
|------|------|------|------|------|------|
| 0000 | 0000 | 0011 | 0010 | 0000 | 0000 |

| 0000 | 0000 | 0010 | 0000 | 0000 | 0000 |
|------|------|------|------|------|------|
| 0011 | 0000 | 0000 | 0000 | 0000 | 0001 |

| 0000 | 0001 | 0000 | 0000 | 0011 | 0000 |
|------|------|------|------|------|------|
| 0000 | 0000 | 0000 | 0000 | 0010 | 0000 |

| 0000 | 0010 | 0000 | 0000 | 0000 | 0000 |
|------|------|------|------|------|------|
| 0000 | 0011 | 0000 | 0000 | 0001 | 0000 |

| 0000 | 0000 | 0001 | 0011 | 0000 | 0000 |
|------|------|------|------|------|------|
| 0001 | 0000 | 0000 | 0000 | 0000 | 0010 |

| 0010 | 0000 | 0000 | 0000 | 0000 | 0011 |
|------|------|------|------|------|------|
| 0000 | 0000 | 0000 | 0001 | 0000 | 0000 |

| 1010 | 1011 | 0011 | 0010 | 1001 | 0000 |
|------|------|------|------|------|------|
| 1001 | 1010 | 1011 | 0000 | 0000 | 1001 |

| 1001 | 0000 | 0000 | 1011 | 1010 | 0010 |
|------|------|------|------|------|------|
| 0000 | 1001 | 0001 | 0011 | 1011 | 1010 |

| 0000 | 0011 | 1010 | 1001 | 0001 | 1011 |
|------|------|------|------|------|------|
| 1011 | 0010 | 0000 | 1010 | 1001 | 0000 |

| 0000 | 1001 | 1011 | 0000 | 0010 | 1010 |
|------|------|------|------|------|------|
| 1010 | 0001 | 1001 | 1011 | 0011 | 0000 |

| 0011 | 0000 | 1001 | 1010 | 1011 | 0001 |
|------|------|------|------|------|------|
| 0000 | 0000 | 0010 | 1001 | 1010 | 1011 |

| 1011 | 1010 | 0000 | 0001 | 0000 | 1001 |
|------|------|------|------|------|------|
| 0010 | 1011 | 1010 | 0000 | 0000 | 0011 |

| ATTRIBUTE INFORMATION | INFORMATION ON NUMBER OF DISCHARGES OF INK | PIXEL VALUE | CODE VALUE | | | | | | | |
|---|---|---|---|---|---|---|---|---|---|---|
| | | | 0000 | 0001 | 0010 | 0011 | 1001 | 1010 | 1011 |
| ATTRIBUTE A | 0 | 0000 | 0 | 0 | 0 | 0 | 0 | 0 | 0 | 0 |
| | 1 | 0001 | 0 | 1 | 0 | 0 | 0 | 0 | 0 | 0 |
| | 2 | 0010 | 0 | 1 | 1 | 0 | 0 | 0 | 0 | 0 |
| | 3 | 0011 | 0 | 1 | 0 | 1 | 0 | 0 | 0 | 0 |
| ATTRIBUTE B | 0 | 1000 | 0 | 0 | 0 | 0 | 0 | 0 | 0 | 0 |
| | 1 | 1001 | 0 | 0 | 0 | 0 | 1 | 0 | 0 | 0 |
| | 2 | 1010 | 0 | 0 | 0 | 0 | 1 | 1 | 1 | 0 |
| | 3 | 1011 | 0 | 0 | 0 | 0 | 1 | 1 | 1 | 1 |

FIG. 13A

| A | A | A | A | A | A |
|---|---|---|---|---|---|
| B | B | B | B | B | B |

FIG. 13B

| 1 | 2 | 3 | 1 | 2 | 3 |
|---|---|---|---|---|---|
| 1 | 2 | 3 | 1 | 2 | 3 |

FIG. 13C

| 0001 | 0010 | 0011 | 0001 | 0010 | 0011 |
|------|------|------|------|------|------|
| 1001 | 1010 | 1011 | 1001 | 1010 | 1011 |

FIG. 16

| I | III | II | II | I | III |
|---|---|---|---|---|---|
| II | I | III | III | II | I |

FIG. 17A

| | c0 | c1 | c2 |
|---|---|---|---|
| FOR 0 DISCHARGE OF INK | 0 | 0 | 0 |
| FOR 1 DISCHARGE OF INK | 1 | 0 | 0 |
| FOR 2 DISCHARGES OF INK | 1 | 1 | 0 |
| FOR 3 DISCHARGES OF INK | 1 | 1 | 1 |

FIG. 17B

| | c0 | c1 | c2 |
|---|---|---|---|
| FOR 0 DISCHARGE OF INK | 0 | 0 | 0 |
| FOR 1 DISCHARGE OF INK | 0 | 1 | 0 |
| FOR 2 DISCHARGES OF INK | 0 | 1 | 1 |
| FOR 3 DISCHARGES OF INK | 1 | 1 | 1 |

FIG. 17C

| | c0 | c1 | c2 |
|---|---|---|---|
| FOR 0 DISCHARGE OF INK | 0 | 0 | 0 |
| FOR 1 DISCHARGE OF INK | 0 | 0 | 1 |
| FOR 2 DISCHARGES OF INK | 1 | 0 | 1 |
| FOR 3 DISCHARGES OF INK | 1 | 1 | 1 |

FIG. 18A

| X1c0 | X1c1 | X1c2 | X2c0 | X2c1 | X2c2 | X3c0 | X3c1 | X3c2 | X4c0 | X4c1 | X4c2 | X5c0 | X5c1 | X5c2 | X6c0 | X6c1 | X6c2 |
| X7c0 | X7c1 | X7c2 | X8c0 | X8c1 | X8c2 | X9c0 | X9c1 | X9c2 | X10c0 | X10c1 | X10c2 | X11c0 | X11c1 | X11c2 | X12c0 | X12c1 | X12c2 |

FIG. 18B

| X1c0 | X2c0 | X3c0 | X4c0 | X5c0 | X6c0 |
| X7c0 | X8c0 | X9c0 | X10c0 | X11c0 | X12c0 |

FIG. 18C

| X1c1 | X2c1 | X3c1 | X4c1 | X5c1 | X6c1 |
| X7c1 | X8c1 | X9c1 | X10c1 | X11c1 | X12c1 |

FIG. 18D

| X1c2 | X2c2 | X3c2 | X4c2 | X5c2 | X6c2 |
| X7c2 | X8c2 | X9c2 | X10c2 | X11c2 | X12c2 |

FIG. 19A

| 00 | 00 | 01 | 00 | 00 | 00 |
|----|----|----|----|----|----|
| 01 | 00 | 00 | 00 | 01 | 00 |

| 01 | 00 | 00 | 00 | 01 | 00 |
|----|----|----|----|----|----|
| 00 | 00 | 01 | 00 | 00 | 00 |

| 00 | 00 | 00 | 00 | 00 | 01 |
|----|----|----|----|----|----|
| 00 | 01 | 00 | 01 | 00 | 00 |

| 00 | 01 | 00 | 01 | 00 | 00 |
|----|----|----|----|----|----|
| 00 | 00 | 00 | 00 | 00 | 01 |

| 00 | 01 | 00 | 01 | 00 | 00 |
|----|----|----|----|----|----|
| 00 | 00 | 00 | 00 | 00 | 01 |

| 00 | 00 | 01 | 00 | 00 | 00 |
|----|----|----|----|----|----|
| 01 | 00 | 00 | 00 | 01 | 00 |

| 11 | 11 | 11 | 00 | 11 | 01 |
|----|----|----|----|----|----|
| 00 | 01 | 11 | 01 | 11 | 00 |

| 11 | 11 | 01 | 00 | 11 | 11 |
|----|----|----|----|----|----|
| 01 | 11 | 00 | 11 | 01 | 11 |

| 11 | 01 | 11 | 01 | 11 | 00 |
|----|----|----|----|----|----|
| 00 | 00 | 11 | 11 | 00 | 01 |

| 01 | 00 | 00 | 11 | 01 | 11 |
|----|----|----|----|----|----|
| 11 | 11 | 01 | 11 | 00 | 11 |

| 00 | 00 | 11 | 11 | 00 | 01 |
|----|----|----|----|----|----|
| 11 | 01 | 11 | 01 | 11 | 00 |

| 01 | 11 | 00 | 11 | 01 | 11 |
|----|----|----|----|----|----|
| 11 | 11 | 01 | 00 | 11 | 11 |

| ATTRIBUTE INFORMATION | INFORMATION ON DISCHARGE/ NON-DISCHARGE OF INK | PIXEL VALUE | CODE VALUE | | |
|---|---|---|---|---|---|
| | | | 00 | 01 | 11 |
| ATTRIBUTE A | 0 | 00 | 0 | 0 | 0 |
| | 1 | 01 | 0 | 1 | 0 |
| ATTRIBUTE B | 0 | 10 | 0 | 0 | 0 |
| | 1 | 11 | 0 | 0 | 1 |

| 0001 | 1011 | 1010 | 0000 | 1001 | 0000 |
|------|------|------|------|------|------|
| 1010 | 0000 | 0011 | 0010 | 1011 | 1001 |

| 1001 | 0000 | 0010 | 1010 | 1011 | 0000 |
|------|------|------|------|------|------|
| 0011 | 1010 | 1001 | 0000 | 1010 | 0001 |

| 1010 | 0001 | 1001 | 0000 | 0011 | 1011 |
|------|------|------|------|------|------|
| 1011 | 1001 | 0000 | 1010 | 0010 | 0000 |

| 0000 | 0010 | 1011 | 1001 | 0000 | 1010 |
|------|------|------|------|------|------|
| 0000 | 0011 | 1011 | 1001 | 0001 | 1010 |

| 1011 | 1001 | 0001 | 0011 | 1010 | 1001 |
|------|------|------|------|------|------|
| 0000 | 0000 | 1010 | 1011 | 0000 | 0010 |

| 0010 | 1010 | 0000 | 1011 | 0000 | 0011 |
|------|------|------|------|------|------|
| 1001 | 1011 | 0000 | 0001 | 1001 | 1011 |

| 0000 | 0000 | 0011 | 0010 | 0000 | 0000 |
|------|------|------|------|------|------|
| 0000 | 0000 | 0000 | 0000 | 0000 | 0000 |

| 0000 | 0000 | 0000 | 0000 | 0000 | 0010 |
|------|------|------|------|------|------|
| 0000 | 0000 | 0001 | 0011 | 0000 | 0000 |

| 0000 | 0011 | 0000 | 0000 | 0001 | 0000 |
|------|------|------|------|------|------|
| 0000 | 0010 | 0000 | 0000 | 0000 | 0000 |

| 0000 | 0000 | 0000 | 0000 | 0010 | 0000 |
|------|------|------|------|------|------|
| 0000 | 0001 | 0000 | 0000 | 0011 | 0000 |

| 0011 | 0000 | 0000 | 0000 | 0000 | 0001 |
|------|------|------|------|------|------|
| 0000 | 0000 | 0010 | 0000 | 0000 | 0000 |

| 0000 | 0000 | 0000 | 0001 | 0000 | 0000 |
|------|------|------|------|------|------|
| 0010 | 0000 | 0000 | 0000 | 0000 | 0011 |

| 11 | 11 | 01 | 11 | 00 | 00 |
|----|----|----|----|----|----|
| 01 | 11 | 00 | 11 | 01 | 11 |

| 01 | 11 | 11 | 11 | 01 | 00 |
|----|----|----|----|----|----|
| 11 | 00 | 01 | 11 | 00 | 11 |

| 11 | 00 | 11 | 00 | 11 | 01 |
|----|----|----|----|----|----|
| 11 | 01 | 00 | 01 | 11 | 11 |

| 00 | 01 | 11 | 01 | 11 | 11 |
|----|----|----|----|----|----|
| 11 | 00 | 11 | 00 | 11 | 01 |

| 11 | 01 | 00 | 01 | 11 | 11 |
|----|----|----|----|----|----|
| 00 | 11 | 11 | 00 | 11 | 01 |

| 00 | 11 | 01 | 11 | 00 | 11 |
|----|----|----|----|----|----|
| 01 | 11 | 11 | 11 | 01 | 00 |

| 00 | 00 | 00 | 00 | 00 | 01 |
|----|----|----|----|----|----|
| 00 | 01 | 00 | 01 | 00 | 00 |

| 00 | 00 | 01 | 00 | 00 | 00 |
|----|----|----|----|----|----|
| 01 | 00 | 00 | 00 | 01 | 00 |

| 00 | 01 | 00 | 01 | 00 | 00 |
|----|----|----|----|----|----|
| 00 | 00 | 00 | 00 | 00 | 01 |

| 01 | 00 | 00 | 00 | 01 | 00 |
|----|----|----|----|----|----|
| 00 | 00 | 01 | 00 | 00 | 00 |

| 00 | 00 | 00 | 00 | 00 | 01 |
|----|----|----|----|----|----|
| 00 | 01 | 00 | 01 | 00 | 00 |

| 01 | 00 | 00 | 00 | 01 | 00 |
|----|----|----|----|----|----|
| 00 | 00 | 01 | 00 | 00 | 00 |

} N12'

IMAGE PROCESSING APPARATUS AND IMAGE PROCESSING METHOD

BACKGROUND OF THE INVENTION

Field of the Invention

The present invention relates to an image processing apparatus and an image processing method.

Description of the Related Art

An image printing apparatus is known which prints an image by repeatedly performing print scanning that discharges ink while moving a print head where a plurality of printing nozzles that discharge ink are arranged, relatively in a scanning direction with respect to a unit area of a print medium, and sub scanning that conveys the print medium in a conveyance direction being a direction intersecting the scanning direction. What is called a multipass printing method is known which forms an image by performing print scanning more than once on the unit area in such an image printing apparatus. In the known multipass printing method, image data having one-bit information that determines discharge or non-discharge of ink on a pixel by pixel basis is divided into a plurality of scans. The image data and a plurality of mask patterns having one-bit information that determines whether or not to allow ink to be discharged on a pixel by pixel basis, the plurality of mask patterns corresponding to a plurality of scans, are used to generate print data to be used for printing in the plurality of scans.

It is known to control an ink application order in accordance with the print condition when discharging a plurality of color inks in an image printing apparatus that performs a multipass printing method such as described above. Japanese Patent Application Laid-Open No. 2010-000666 discloses the use of a first mask pattern group including a plurality of mask patterns whose print permitting rates are substantially equal to each other, and a second mask pattern group including a plurality of mask patterns where the print permitting rates of mask patterns corresponding to scans of the second half are set to be higher than the print permitting rates of mask patterns corresponding to scans of the first half. According to Japanese Patent Application Laid-Open No. 2010-000666, if the amount of discharge of a cyan ink is larger than that of a magenta ink, the first mask pattern group is applied to image data corresponding to the cyan ink. Print data is generated such that the amounts of discharge are substantially equal to each other in a plurality of scans. Moreover, if the amount of discharge of the cyan ink is smaller than that of the magenta ink, the second mask pattern group is applied to image data corresponding to the cyan ink. Print data is generated such that the amount of discharge in the scans of the second half among the plurality of scans is larger than the amount of discharge in the scans of the first half. Consequently, it is possible not to especially specify the ink application order if the amount of discharge of the cyan ink is larger than that of the magenta ink, and to control the application order such that the cyan ink is applied onto a print medium later than the magenta ink if the amount of discharge of the cyan ink is smaller than that of the magenta ink.

On the other hand, in recent years, it has been known to generate print data using image data having multiple-bit information that determines the number of discharges of ink on a pixel by pixel basis, and a plurality of mask patterns having multiple-bit information that determines the allowable number of discharges of ink on a pixel by pixel basis, the plurality of mask patterns corresponding to a plurality of scans. Print data is generated in this manner to make it possible to discharge ink more than once to one pixel area. For example, a case where pieces of information respectively configuring image data and a mask pattern are two bits is described in Japanese Patent Application Laid-Open No. 2003-175592.

However, if image data and a mask pattern, which each include multiple-bit information, are used to discharge ink more than once to one pixel area, the number of bits of information configuring the image data and the mask pattern is increased. Consequently, memory with a certain degree of large capacity may be required as compared to the known case where image data and a mask pattern, which each include one-bit information per pixel, are used.

It may be required here to store a plurality of mask pattern groups according to the print conditions for image data corresponding to a given ink in order to control the ink application order according to the print condition if the above-mentioned technology described in Japanese Patent Application Laid-Open No. 2010-000666 is used. In other words, a first and a second mask pattern groups different from each other are stored in advance. If the print condition is a first print condition, the first mask pattern group is applied to generate print data. If the print condition is a second print condition that is different from the first print condition, the second mask pattern group is applied to generate print data. A plurality of mask pattern groups each having multiple-bit information per pixel is stored in this manner, and accordingly larger-capacity memory may be required.

Furthermore, a mask pattern is generally designed at a certain degree of size (for example, a size of 12 pixels in total: six pixels in an X direction and two pixels in a Y direction). In the technology described in Japanese Patent Application Laid-Open No. 2010-000666, the mask pattern group to be applied is changed according to the print condition. Accordingly, the ink application order can be controlled only by size of the mask pattern. A size smaller than the size of the mask pattern is assumed to be a size for determining a print condition (for example, a size of six pixels in total: three pixels in the X direction and two pixels in the Y direction). A mask pattern is divided according to the determination size to be applied. Accordingly, the application order can be controlled by size that is smaller than the size of the mask pattern. However, the processing load of a control unit is increased.

SUMMARY OF THE INVENTION

One aspect of the present invention is an image processing apparatus for generating print data used in each of K relative scans performed on a unit area on a print medium by a print head for discharging ink, the print data determining discharge or non-discharge of ink to each pixel area corresponding to a plurality of pixels in the unit area. The image processing apparatus includes: a first acquisition unit configured to acquire image data that corresponds to an image to be printed in the unit area and that determines an attribute of each of the plurality of pixels in the image, and a number of discharges of ink from zero to N (N≥2) to each of the plurality of pixels; and a generation unit configured to generate the print data based on the image data acquired by the first acquisition unit, and K mask patterns that correspond to the K scans and that determine allowing or disallowing ink to be discharged in accordance with the attribute and number of discharges indicated at each of the plurality of pixels by the image data. In the image processing apparatus, first print permitting pixels and second print permitting pixels are placed in the K mask patterns such that (i) a difference between a number of the first print permitting pixels placed in J (1<J<K) mask patterns corresponding to J scans from the first scan to the J-th scan among the K scans and the number of the first print permitting pixels placed in K−J mask pattern corresponding to K−J scans from the J+1-th scan to a K-th scan among the K scans is a first value, and (ii) a difference between a number of the second print permitting pixels placed in the J mask patterns corresponding to the J scans and the number of the second print permitting pixels placed in the K−J mask patterns corresponding to the K−J scans is a second value larger than the first value, the first print permitting pixels allowing ink to be discharged when the attribute is a first attribute and the number of discharges is M (1≤M≤N), the attribute and number of discharges being indicated by the image data, and disallowing ink to be discharged when the attribute is the first attribute and the number of discharges is M−1, the attribute and number of discharges being indicated by the image data, the second print permitting pixels allowing ink to be discharged when the attribute is a second attribute different from the first attribute and the number of discharges is M, the attribute and number of discharges being indicated by the image data, and disallowing ink to be discharged when the attribute is the second attribute and the number of discharges is M−1, the attribute and number of discharges being indicated by the image data.

Further features of the present invention will become apparent from the following description of exemplary embodiments (with reference to the attached drawings).

BRIEF DESCRIPTION OF THE DRAWINGS

FIGS. 6A to 6E are diagrams for explaining a process of processing multiple-bit image data.

FIG. 7 is a diagram illustrating an example of a decoding table.

FIG. 9 is a diagram illustrating an attribute selection table in an embodiment.

FIGS. 11A to 11L are diagrams illustrating mask patterns in an embodiment.

FIG. 12 is a diagram illustrating a decoding table in an embodiment.

FIGS. 13A to 13C are diagrams for explaining an example of image data in an embodiment.

FIG. 16 is a schematic diagram illustrating an index pattern selection table in an embodiment.

FIGS. 17A to 17C are diagrams illustrating index patterns in an embodiment.

FIGS. 18A to 18D are diagrams for explaining a process of generating image data in an embodiment.

FIGS. 19A to 19L are diagrams illustrating mask pattern in an embodiment.

FIG. 20 is a diagram illustrating a decoding table in an embodiment.

FIGS. 21A to 21F are diagrams illustrating examples of image data in an embodiment.

FIGS. 24A to 24L are diagrams illustrating mask patterns in an embodiment.

FIGS. 25A to 25L are diagrams illustrating mask patterns in an embodiment.

DESCRIPTION OF THE EMBODIMENTS

A first embodiment of the present invention is described in detail hereinafter with reference to the drawings.

(First Embodiment)

Figure 1:
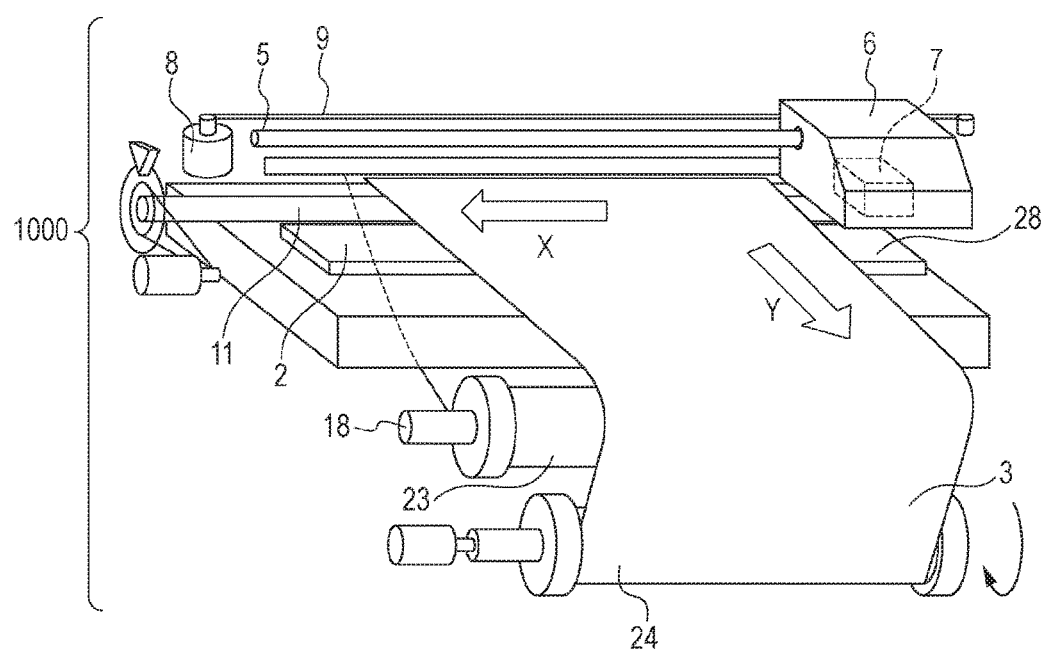
FIG. 1 is a perspective view of an image printing apparatus applied in an embodiment.
Figure 2:
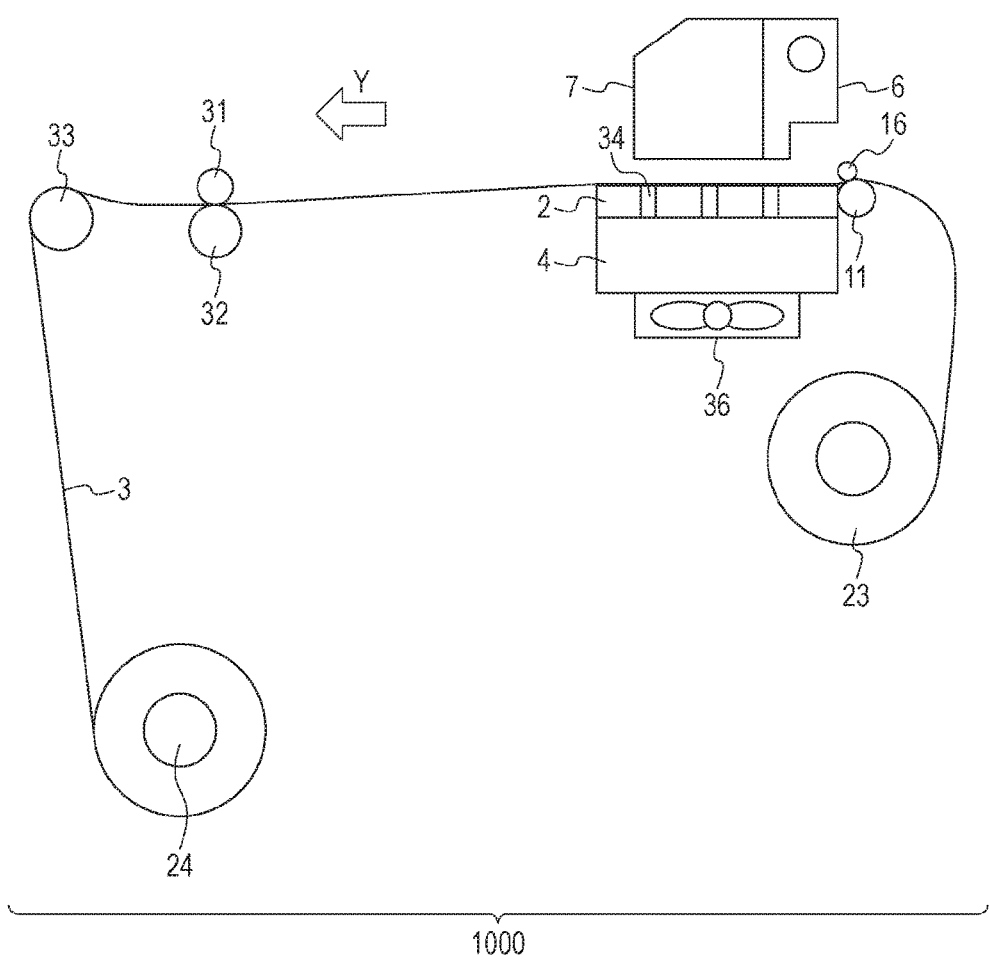
FIG. 2 is a cross-sectional view of an internal mechanism of an image printing apparatus applied in an embodiment.

FIG. 1 is a perspective view partially illustrating an internal configuration of an image printing apparatus 1000 according to the first embodiment of the present invention. Moreover, FIG. 2 is a cross-sectional view partially illustrating an internal configuration of the image printing apparatus 1000 according to the first embodiment of the present invention.

A platen 2 is placed inside the image printing apparatus 1000. Multiple suction holes 34 are formed in the platen 2 to suction a print medium 3 and prevent the print medium 3 from rising. The suction holes 34 are connected to a duct. Furthermore, a suction fan 36 is placed below the duct. The suction fan 36 is operated to suction the print medium 3 to the platen 2.

A carriage 6 is supported by a main rail 5 installed extending in a sheet width direction, and is configured to be movable in a reciprocating manner in an X direction (a scan direction). An inkjet print head 7, which is described later, is mounted in the carriage 6. Various printing technologies such as a thermal jet technology using a heating device and a piezoelectric technology using a piezoelectric element can be applied to the print head 7. A carriage motor 8 is a drive source for moving the carriage 6 in the X direction to transfer its rotational driving force to the carriage 6 by a belt 9.

The print medium 3 is fed by being rolled out of a medium 23 that is wound like a roll. The print medium 3 is conveyed on the platen 2 toward a Y direction (a conveyance direction) intersecting the X direction. A leading end of the print medium 3 is held between a pinch roller 16 and a conveyance roller 11. The print medium 3 is conveyed with the drive of the conveyance roller 11. Moreover, the print medium 3 is held between a roller 31 and a discharge roller 32 downstream of the platen 2 in the Y direction. Furthermore, the print medium 3 is wound around a wind-up roller 24 via a turning roller 33.

Figure 3:
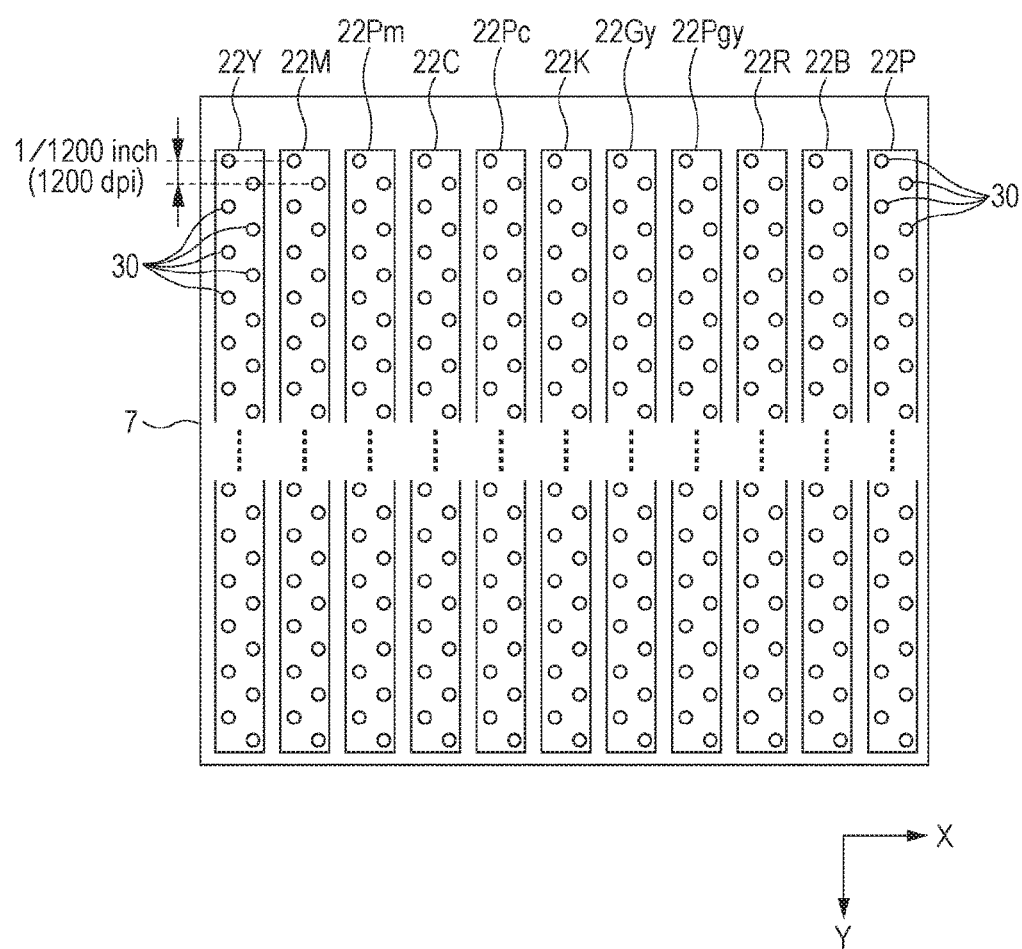
FIG. 3 is a schematic diagram of a print head applied in an embodiment.

FIG. 3 illustrates a print head used in the embodiment.

The print head 7 is configured to arrange 11 nozzle arrays 22Y, 22M, 22Pm, 22C, 22Pc, 22Bk, 22Gy, 22Pgy, 22R, 22B, and 22P (one of these nozzle arrays is also hereinafter referred to as the nozzle array 22) in this order in the X direction, the 11 nozzle arrays being capable of discharging inks of yellow (Y), magenta (M), photo magenta (Pm), cyan (C), photo cyan (Pc), black (Bk), gray (Gy), photo gray (Pgy), red (R), blue (B), and processing liquid (P) having a purpose other than coloring such as protecting a print surface and improving uniformity in gloss, respectively. The nozzle array 22 is configured such that 1280 nozzles 30 that discharge its ink are arranged in the Y direction (arranging direction) at a density of 1200 dpi. The nozzles 30 adjacent to each other in the Y direction are placed at positions staggered in the X direction. The amount of ink to be discharged at a time from one nozzle 30 is approximately 4.5 ng in the embodiment.

These nozzle arrays 22K, 22C, 22M, and 22Y are connected to unillustrated ink tanks storing their corresponding inks to supply the inks. The print head 7 and the ink tanks, which are used in the embodiment, may be configured integrally, or may be configured to be separable.

Figure 4:
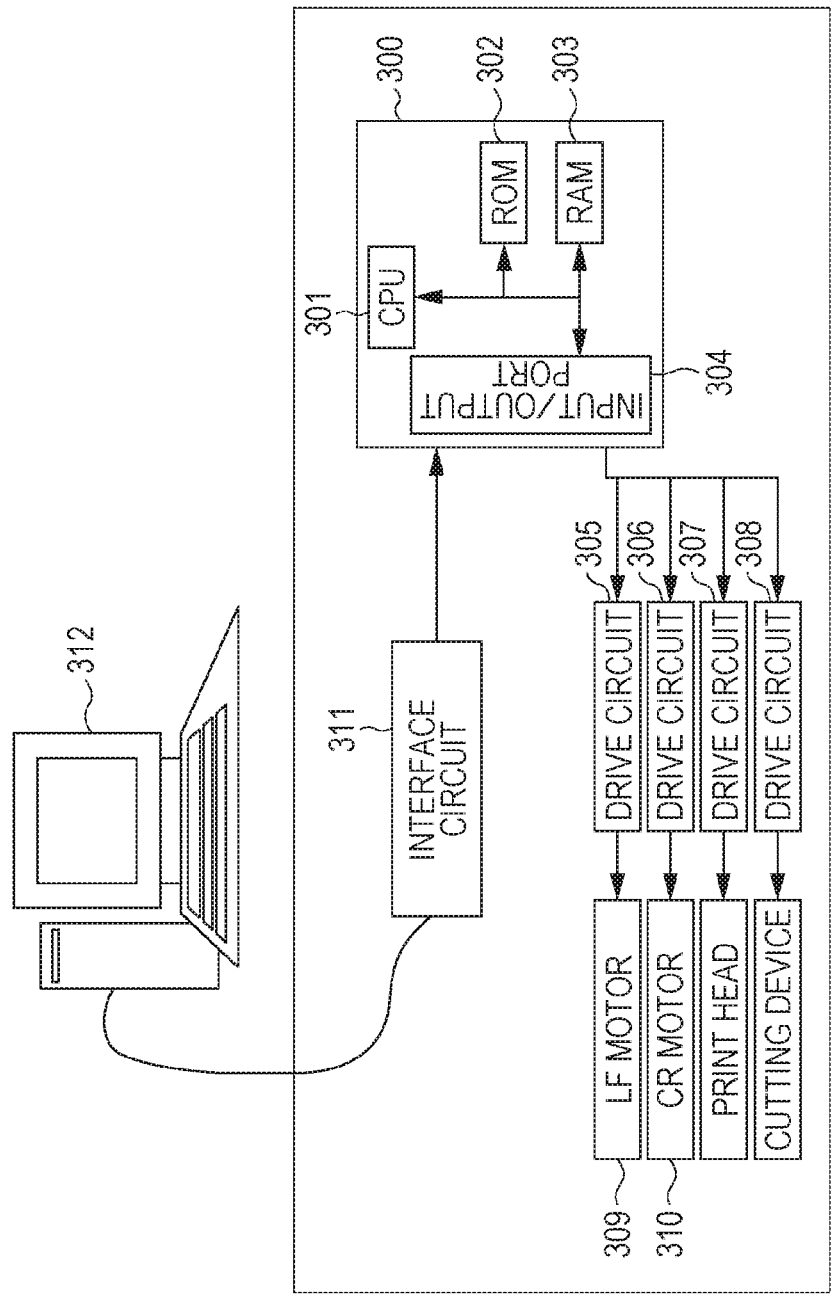
FIG. 4 is a schematic diagram illustrating a control system for printing in an embodiment.

FIG. 4 is a block diagram illustrating a schematic configuration of a control system in the embodiment. A main control unit 300 includes a CPU 301 that executes processing operations such as computing, selection, determination, and control, a ROM (memory) 302 that stores a control program to be executed by the CPU 301, and the like, a RAM 303 used as a buffer of print data, and the like, and input/output ports 304. Moreover, mask patterns described later, and the like are also stored in the ROM 302. Drive circuits 305, 306, 307, and 308 of actuators and the like in a conveyance motor (LF motor) 309, a carriage motor (CR motor) 310, the print head 7, and a cutting unit are connected to the input/output ports 304. Furthermore, the main control unit 300 is connected to a PC 312 being a host computer via an interface circuit 311.

In the embodiment, an image is formed in accordance with a multipass printing method. The multipass printing method is described in detail below.

Figure 5:
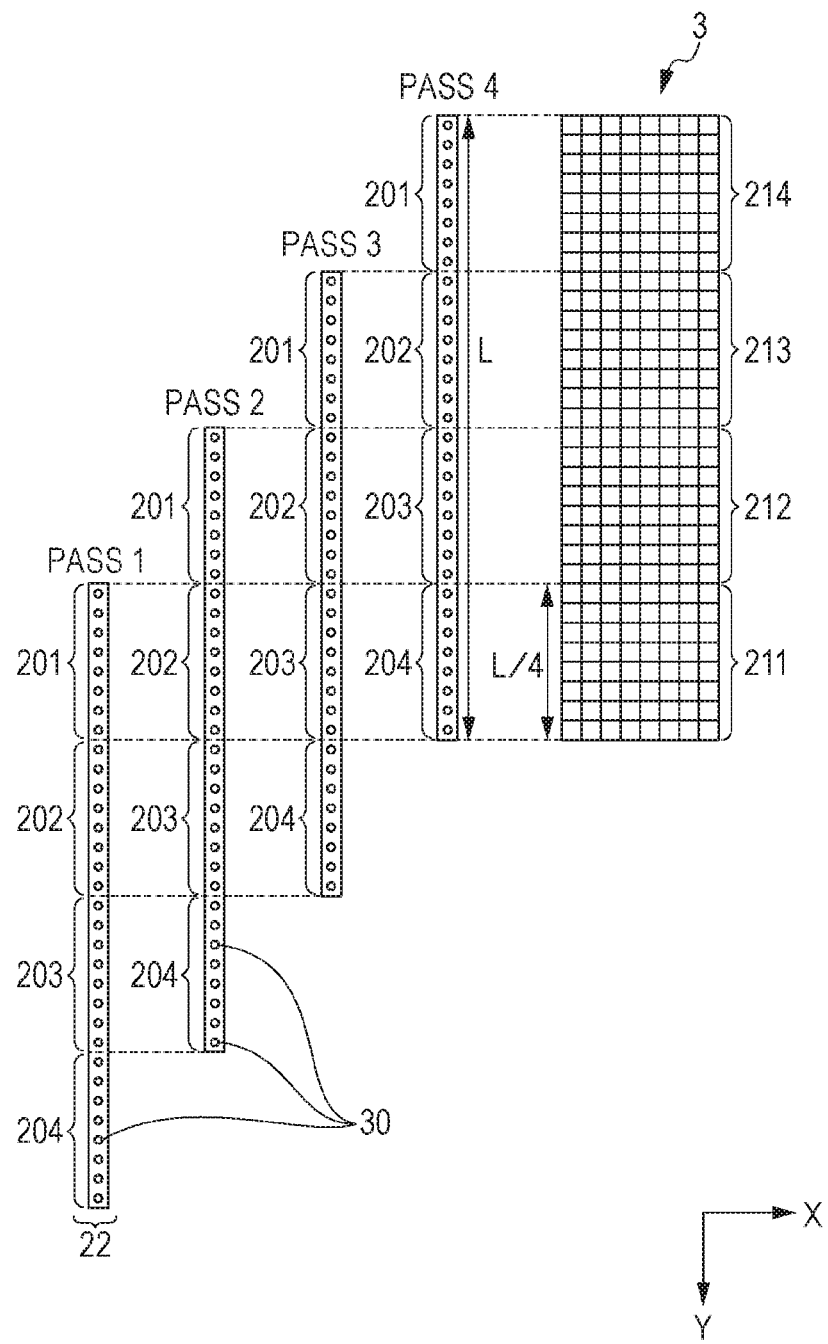
FIG. 5 is a diagram for explaining a general multipass printing method.

FIG. 5 is a diagram for explaining a general multipass printing method performed upon printing in a unit area on a print medium in four print scans.

The nozzles 30 provided to the nozzle array 22 that discharges ink are divided into four printing groups 201, 202, 203, and 204 along a sub-scanning direction.

In a first print scan (pass 1), the ink is discharged to a unit area 211 on the print medium 3 from the printing group 201.

Next, the print medium 3 is conveyed a distance of L/4 relatively with respect to the print head 7 from the upstream side to the downstream side in the Y direction. For the purpose of simplicity, a case where the print head 7 is conveyed with respect to the print medium 3 from the downstream side to the upstream side in the Y direction is illustrated here. However, a relative positional relationship between the print medium 3 conveyed and the print head 7 is the same as the case where the print medium 3 is conveyed downstream in the Y direction.

A second print scan is subsequently performed. In the second print scan (pass 2), the ink is discharged to the unit area 211 on the print medium from the printing group 202, and to a unit area 212 from the printing group 201.

A print scan by the print head 7 and relative conveyance of the print medium 3 are alternately repeated. As a result, after the fourth print scan (pass 4) is performed, the ink has been discharged once to the unit area 211 of the print medium 3 from each of the printing groups 201 to 204.

In the embodiment, in the above-mentioned multipass printing method, image data having b-bit (b≥2) information, a mask pattern having multiple-bit information, and a decoding table that determines discharge or non-discharge of ink in accordance with a combination of values indicated by the pieces of multiple-bit information of both the image data and the mask pattern are used to generate, from the image data, one-bit print data to be used for printing in each scan. A case where the image data and the mask pattern each have two-bit information is described in the following description.

FIGS. 6A to 6E are diagrams for explaining a process of generating print data using image data and mask patterns, which each include multiple-bit information. Moreover, FIG. 7 is a diagram illustrating a decoding table used when generating print data such as illustrated in FIGS. 6D-1 to 6D-4.

FIG. 6A is a diagram schematically illustrating 16 pixels 700 to 715 in a given unit area. For the purpose of simplicity, the unit area including 16 pixels is used here for description. However, the number of pixels in the unit area can be set to a different value as appropriate.

FIG. 6B is a diagram illustrating an example of image data corresponding to a unit area. The image data includes two-bit information as described above. It is possible to reproduce four, which is 2 raised to the power of 2 ($=2^2$), possible numbers of discharges of ink at the maximum. Furthermore, a maximum value of the reproducible number of discharges of ink is 3 being a value obtained by subtracting 1 from 2 raised to the power of 2 ($=(2^2)-1$).

Specifically, if two-bit information that configures image data and corresponds to a given pixel (hereinafter also referred to as the pixel value) is "00," the ink is never discharged to the pixel. Moreover, if the pixel value is "01," the ink is discharged once to the corresponding pixel. Moreover, if the pixel value is "10," the ink is discharged twice to the corresponding pixel. Moreover, if the pixel value is "11," the ink is discharged three times to the corresponding pixel.

In terms of the image data illustrated in FIG. 6B, the pixel value of, for example, the pixels 703, 707, 711, and 715 is "00." Therefore, the ink is never discharged. Moreover, the pixel value of, for example, the pixels 700, 704, 708, and 712 is "11." Therefore, the ink is discharged as many as three times.

FIGS. 6C-1 to 6C-4 are diagrams illustrating mask patterns, corresponding respectively to the first to fourth scans, for being applied to the image data illustrated in FIG. 6B. In other words, a mask pattern that corresponds to the first scan and is illustrated in FIG. 6C-1 is applied to the image data illustrated in FIG. 6B. Accordingly, print data to be used in the first scan is generated. Similarly, mask patterns illustrated respectively in FIGS. 6C-2, 6C-3, and 6C-4 are applied to the image data illustrated in FIG. 6B. Accordingly, print data used in the second, third, and fourth scans is generated.

Any of "00," "01," "10," and "11" is assigned as two-bit information (hereinafter also referred to as the code value) to each pixel in the mask patterns illustrated in FIGS. 6C-1 to 6C-4.

As can be seen from reference to the decoding table illustrated in FIG. 7, when the code value is "00," even if the two-bit information (pixel value) of a corresponding pixel in the image data is any of "00," "01," "10," and "11," the ink is not discharged. In other words, the code value "00" in a mask pattern corresponds to not at all allowing (disallowing) the discharge of ink. In the following description, a pixel to which the code value "00" is assigned in a mask pattern is also referred to as the print non-permitting pixel.

On the other hand, as can be seen from reference to the decoding table illustrated in FIG. 7, when the code value is "01," if the pixel value of a corresponding pixel is "00," "01," or "10," the ink is not discharged. However, if the pixel value is "11," the ink is discharged. To put it differently, the code value "01" corresponds to allowing the discharge of ink only once (the allowable number of discharges of ink is one) for the four possible pixel values ("00," "01," "10," and "11").

Moreover, when the code value is "10," if the pixel value of a corresponding pixel is "00" or "01," the ink is not discharged. However, if the pixel value is "10" or "11," the ink is discharged. In other words, the code value "10" corresponds to allowing the discharge of ink twice (the allowable number of discharges of ink is two) for the four possible pixel values.

Furthermore, when the code value is "11," if the pixel value of a corresponding pixel is "00," the ink is not discharged. However, if the pixel value is "01," "10," or "11," the ink is discharged. In other words, the code value "11" corresponds to allowing the discharge of ink three times (the allowable number of discharges of ink is three) for the four possible pixel values. In the following description, a pixel to which any of the code values "01," "10," and "11" is assigned in a mask pattern is also referred to as the print permitting pixel.

A general mask pattern having multiple-bit information is set based on the following (condition 1) and (condition 2).

(Condition 1)

Each of the code values "01," "10," and "11" is assigned to three of four pixels that are at the same position in the four mask patterns illustrated in FIGS. 6C-1 to 6C-4 (the print permitting pixels). The code value "00" is assigned to the remaining one (=4−3) pixel (the print non-permitting pixel).

For example, in terms of the pixel 700, the code value "01" is assigned in the mask pattern illustrated in FIG. 6C-3, the code value "10" in the mask pattern illustrated in FIG. 6C-2, and the code value "11" in the mask pattern illustrated in FIG. 6C-1. The code value "00" is assigned in the mask pattern illustrated in the remaining FIG. 6C-4. To put it differently, the pixel 700 is the print permitting pixel in the mask patterns illustrated in FIGS. 6C-1, 6C-2, and 6C-3, but is the print non-permitting pixel in the mask pattern illustrated in FIG. 6C-4.

Moreover, in terms of the pixel 701, the code value "01" is assigned in the mask pattern illustrated in FIG. 6C-2, the code value "10" in the mask pattern illustrated in FIG. 6C-1, and the code value "11" in the mask pattern illustrated in FIG. 6C-4. The code value "00" is assigned in the mask pattern illustrated in the remaining FIG. 6C-3. To put it differently, the pixel 701 is the print permitting pixel in the mask patterns illustrated in FIGS. 6C-1, 6C-2, and 6C-4, but is the print non-permitting pixel in the mask pattern illustrated in FIG. 6C-3.

With such a configuration, even if the pixel value of a given pixel is any of "00," "01," "10," and "11," it is possible to generate print data that allows ink to be discharged to the given pixel the number of times corresponding to the pixel value.

(Condition 2)

Moreover, the print permitting pixels corresponding to the code value "01" are placed equally in number in the mask patterns illustrated respectively in FIGS. 6C-1 to 6C-4. More specifically, the code value "01" is assigned to four pixels 702, 707, 708, and 713 in the mask pattern illustrated in FIG. 6C-1. Moreover, the code value "01" is assigned to four pixels 701, 706, 711, and 712 in the mask pattern illustrated in FIG. 6C-2. Moreover, the code value "01" is assigned to four pixels 700, 705, 710, and 715 in the mask pattern illustrated in FIG. 6C-3. Moreover, the code value "01" is assigned to four pixels 703, 704, 709, and 714 in the mask pattern illustrated in FIG. 6C-4. In other words, four print permitting pixels corresponding to the code value "01" are placed in each of the four mask patterns illustrated in FIGS. 6C-1 to 6C-4.

Similarly, the print permitting pixels corresponding to the code value "10" are also placed equally in number in the mask patterns illustrated respectively in FIGS. 6C-1 to 6C-4. Furthermore, the print permitting pixels corresponding to the code value "11" are also placed equally in number in the mask patterns illustrated respectively in FIGS. 6C-1 to 6C-4.

The case has been described here in which the print permitting pixels corresponding to each of the code values "01," "10," and "11" in the mask patterns are placed equally in number. However, it actually may require that the print permitting pixels are placed substantially equally in number.

Consequently, when image data is split into four scans to generate print data using the mask patterns illustrated respectively in FIGS. 6C-1 to 6C-4, the printing rates can be made equal to each other in the four scans.

FIGS. 6D-1 to 6D-4 are respectively diagrams illustrating print data generated by applying the mask patterns illustrated respectively in FIGS. 6C-1 to 6C-4 to the image data illustrated in FIG. 6B.

For example, at the pixel 700 in the print data corresponding to the first scan illustrated in FIG. 6D-1, the pixel value in the image data is "11," and the code value in the mask pattern is "11." Hence, as can be seen from reference to the decoding table illustrated in FIG. 7, the discharge of ink ("1") is determined at the pixel 700. Moreover, at the pixel 701, the pixel value in the image data is "10," and the code value in the mask pattern is "10." Therefore, the discharge of ink ("1") is determined. Moreover, at the pixel 704, the pixel value in the image data is "11," and the code value in the mask pattern is "00." Therefore, the non-discharge of ink ("0") is determined.

The ink is discharged in the first to fourth scans in accordance with the print data generated in this manner, the print data being illustrated respectively in FIGS. 6D-1 to 6D-4. For example, as can be seen from the print data illustrated in FIG. 6D-1, the ink is discharged to pixel areas corresponding to the pixels 700, 701, 705, 708, 710, and 712 on the print medium in the first scan.

FIG. 6E is a diagram illustrating a logical sum of the print data illustrated respectively in FIGS. 6D-1 to 6D-4. The ink is discharged in accordance with the print data illustrated respectively in FIGS. 6D-1 to 6D-4 to discharge the ink the number of times illustrated in FIG. 6E to a pixel area corresponding to each pixel.

For example, at the pixel 700, the discharge of ink is determined in the print data corresponding to the first, second, and third scans illustrated in FIGS. 6D-1, 6D-2, and 6D-3. Therefore, as illustrated in FIG. 6E, the ink is discharged three times in total to the pixel area corresponding to the pixel 700.

Moreover, at the pixel 701, the discharge of ink is determined in the print data corresponding to the first and fourth scans illustrated in FIGS. 6D-1 and 6D-4. Therefore, as illustrated in FIG. 6E, the ink is discharged twice in total to the pixel area corresponding to the pixel 701.

From a comparison of the print data illustrated in FIG. 6E and the image data illustrated in FIG. 6B, it can be seen that the print data is generated such that the ink is discharged to any pixel the number of times corresponding to its pixel value in the image data. For example, the pixel value of the pixels 700, 704, 708, and 712 in the image data illustrated in FIG. 6B is "11," and their number of discharges of ink indicated by the logical sums of the print data generated is also three.

The above configuration makes it possible to generate one-bit print data used in each of a plurality of scans based on image data having multiple-bit information and mask patterns having multiple-bit information.

A process of processing data in the embodiment is described in detail below.

Figure 8:
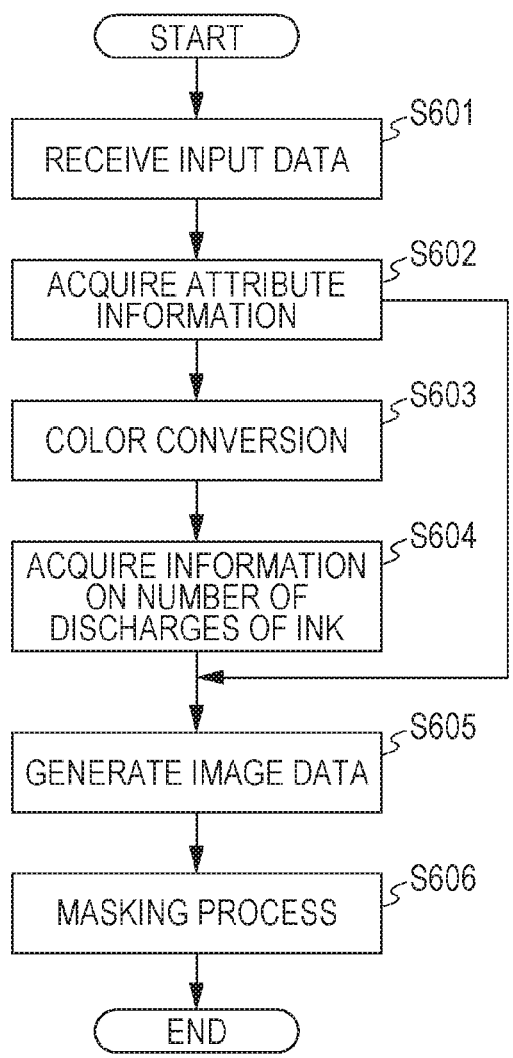
FIG. 8 is a diagram for explaining a process of processing data in an embodiment.

FIG. 8 is a flowchart of a control program that executes RGB data processing in the embodiment.

Firstly, in Step S601, multi-valued data in the RGB format (RGB data) input into the image printing apparatus 1000 is received from the PC 312 being the host computer.

Next, in Step S602, information is acquired which is related to an attribute indicating whether or not to control the ink application order on a pixel by pixel basis based on RGB values of the RGB data.

FIG. 9 is a schematic diagram illustrating an attribute selection table indicating a correlation between the RGB values of the RGB data and the attribute in the embodiment. Each of numerical values illustrated in FIG. 9 indicates a scan where each ink is discharged. For example, if (R, G, B)=(0, 0, 0), the yellow ink is described as "1-6" in FIG. 9. Therefore, the ink is discharged in the first to sixth scans.

If the density in the image is high, that is, if the total of the R, G, and B values of the RGB data is relatively small, a relatively large amount of ink is applied to a print medium. If inks including pigments are applied to the same area, the second ink droplet overlaying the first ink, the second ink droplet may be fixed, displaced from an originally intended application position by the first ink droplet. This phenomenon occurs remarkably especially when the ink includes resin.

If a relatively high density ink (such as the C ink, M ink, or K ink) is applied first to a given pixel, and then a relatively low density ink (such as the Pc ink, Lm ink, or Pgy ink) is applied overlaying the relatively high density ink, the influence of a reduction in image quality is relatively small in the image obtained since displacement in ink fixation occurs in the low density ink. Conversely, if inks are applied in order of a relatively low density ink and a relatively high density ink, displacement in fixation position occurs in the relatively high density ink. Accordingly, a reduction in image quality can become remarkable.

Therefore, in the embodiment, in order to prevent the occurrence of displacement of a high density ink from its fixation position, the ink discharge order is controlled in such a manner as to, if the density in the image is high, discharge only a relatively high density ink in six scans of the first half among K (12 in the embodiment) scans of a unit area, and discharge only a relatively low density ink in six scans of the second half. In the embodiment, the attribute in an image to be printed while controlling the ink application order in this manner is referred to as the attribute B.

On the other hand, if the density in the image is low, that is, if the total of the R, G, and B values of the RGB data is relatively large, a relatively small amount of ink is applied. Therefore, displacement in ink fixation position hardly occurs in a relatively high density ink, the displacement resulting from the above-mentioned ink application order. Hence, in this case, the ink application order is not especially restricted. All the inks are similarly discharged to a unit area in a plurality of (12) scans. Consequently, printing can be performed without reducing the number of scans per color ink as compared to the case where scans are divided into the first half and the second half on an ink by ink basis to apply the inks. Accordingly, a remarkable effect of preventing a reduction in image quality with the multipass printing method can be obtained. In the embodiment, the attribute in an image to be printed without especially controlling the ink application order in this manner is referred to as the attribute A.

For example, as can be seen from FIG. 9, in a case of RGB data of (R, G, B)=(255, 255, 255), it is determined to be the attribute A. All the ink colors are printed in all the passes from the first pass to the twelfth pass. On the other hand, in a case of RGB data of (R, G, B)=(0, 0, 0), it is determined to be the attribute B, printing in the relatively high density Y, M, C, K, Gy, R, and B inks is complete only in the first to sixth passes of the first half. Printing in the relatively low density Pm, Pc, Pgy, and P inks is complete only in the seventh to twelfth passes of the second half.

It may be a mode that determines the attribute by an operation from the RGB values of RGB data without using the attribute selection table such as illustrated in FIG. 9. For example, it may be a mode that determines to be the attribute A if the RGB values of RGB data satisfy the following (equation 1), and determines to be the attribute B if the RGB values of RGB data satisfy the following (equation 2).

$$R+G+B \geq 384 (=256/2 \times 3) \quad \text{(Equation 1)}$$

$$R+G+B < 384 (=256/2 \times 3) \quad \text{(Equation 2)}$$

In the embodiment, the above-mentioned attribute determination process is performed pixel by pixel to acquire attribute information of each pixel. The acquired attribute information is stored as a-bit ($a \geq 1$) information in the ROM 302. In the embodiment, a=1. A value of "0" is stored as the one-bit information related to the attribute if the attribute of a given pixel is the attribute A, and a value of "1" if the attribute is the attribute B.

Return to FIG. 8. The processing of Step S602 and later is described.

In Step S603, conversion is performed into grayscale data corresponding to a color of an ink used to print the RGB data.

Next, in Step S604, information is acquired which is related to the number of discharges of ink indicated by b-bit ($b \geq a$) information. In the embodiment, b=2. In Step S604, the grayscale data is converted into four values (quantized) to acquire four-valued data (quantized data) including any of the pixel values "00," "01," "10," and "11" per pixel. The known dithering method, error diffusion method, and the like can be applied as the quantization process.

Next, in Step S605, image data indicated by c-bit ($c \geq a+b$) information is generated based on the a-bit information related to the attribute acquired in Step S602 and the b-bit information related to the number of discharges of ink generated in Step S604. In the embodiment, c=4. If the data is "wxyz" in the following description, "z" is referred to as the first bit, "y" as the second bit, "x" as the third bit, and "w" as the fourth bit.

In the embodiment, the value indicated by the one-bit information related to the attribute is assigned to the fourth bit of the image data, and the pixel value indicated by the two-bit information related to the number of discharges of ink to the first and second bits of the image data. Moreover, "0" is assigned to the third bit of the image data. For example, if the value of a given pixel indicated by the one-bit information related to the attribute is "1," and the pixel's code value indicated by the two-bit information related to the number of discharges of ink is "01," image data having a value of "1001" is generated at the pixel. Moreover, if the one-bit information of a given pixel related to the attribute is "0," and the pixel's two-bit information related to the number of discharges of ink is "10," image data having a value of "0010" is generated at the pixel. Here, the code value indicated by the information related to the number of discharges of ink is assigned to the first and second bits of the four bits, and the value indicated by the information related to the attribute to the fourth bit. However, the bit number assignment may be different.

Next, in Step S606, a masking process described below is performed to generate print data used in each of the 12 scans.

The masking process performed in the embodiment is described in detail below.

Figure 10:
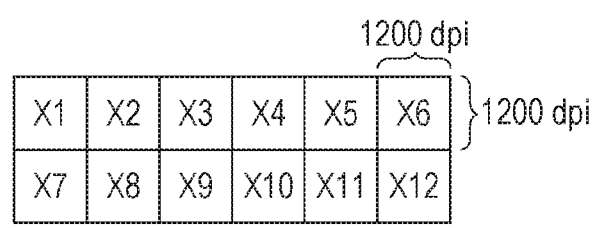
FIG. 10 is a diagram for explaining an example of a unit area in an embodiment.

For the purpose of simplicity, in the following description, the unit area is assumed to be an area including a pixel area corresponding to 12 pixels in total: six pixels in the X direction and two pixels in the Y direction. FIG. 10 is a diagram schematically illustrating 12 pixels X1 to X12 corresponding to the unit area. One pixel has a size of 1200 dpi×1200 dpi. 1200 dpi corresponds to a resolution of 1/1200 inch.

FIGS. 11A to 11L are schematic diagrams illustrating mask patterns applied to image data corresponding to the Pc ink in the embodiment. The mask patterns corresponding to the Pc ink are illustrated here as examples. However, mask patterns vary depending on the ink in the embodiment.

Moreover, FIG. 12 is a diagram illustrating a decoding table applied in the embodiment.

As described above, in the embodiment, printing is performed on the unit area in 12 scans in total. FIGS. 11A to 11L illustrate mask patterns M1 to M12 corresponding to the first to twelfth scans, respectively.

Here, a code value indicated by four-bit information is assigned to each pixel in the mask patterns illustrated in FIGS. 11A to 11L. Specifically, any of seven code values "0000," "0001," "0010," "0011," "1001," "1010," and "1011" is assigned to each pixel.

The code values are described in detail below with reference to the decoding table illustrated in FIG. 12.

As can be seen from FIG. 12, when the code value is "0000," the non-discharge of ink is determined ("0") irrespective of the pixel value in the image data. In other words, the ink is not discharged at all to a pixel where the code value "0000" is determined in the mask pattern. In the embodiment, the pixel to which the code value "0000" is assigned in the mask pattern is referred to as the print non-permitting pixel.

Next, when the code value is "0011," if the attribute of a corresponding pixel is the attribute A and its number of discharges of ink is three, the ink is discharged. On the other hand, if the attribute of a corresponding pixel is the attribute A and its number of discharges of ink is any of zero to two, the ink is not discharged. Furthermore, if the attribute of a corresponding pixel is the attribute B, the ink is not discharged irrespective of the number of discharges of ink. Therefore, the code value "0011" allows the ink to be discharged when the pixel value is "0011," but does not allow the ink to be discharged when the pixel value is any of the other values. To put it differently, the code value "0011" allows the ink to be discharged once for four possible pixel values ("0000," "0001," "0010," and "0011") if the attribute of a corresponding pixel is the attribute A.

Moreover, when the code value is "0010," if the attribute of a corresponding pixel is the attribute A and its number of discharges of ink is two or three, the ink is discharged. On the other hand, if the attribute of a corresponding pixel is the attribute A and its number of discharges of ink is zero or one, the ink is not discharged. Furthermore, if the attribute of a corresponding pixel is the attribute B, the ink is not discharged irrespective of the number of discharges of ink. Therefore, the code value "0010" allows the ink to be discharged when the pixel value is "0011" or "0010," but does not allow the ink to be discharged when the pixel value is any of the other values. To put it differently, the code value "0010" allows the ink to be discharged twice for the four possible pixel values if the attribute of a corresponding pixel is the attribute A.

Moreover, when the code value is "0001," if the attribute of a corresponding pixel is the attribute A and its number of discharges of ink is any of one to three, the ink is discharged. On the other hand, if the attribute of a corresponding pixel is the attribute A and its number of discharges of ink is zero, the ink is not discharged. Furthermore, if the attribute of a corresponding pixel is the attribute B, the ink is not discharged irrespective of the number of discharges of ink. Therefore, the code value "0001" allows the ink to be discharged when the pixel value is "0011," "0010," or "0001," but does not allow the ink to be discharged when the pixel value is the other value. To put it differently, the code value "0001" allows the ink to be discharged three times for the four possible pixel values if the attribute of a corresponding pixel is the attribute A.

In this manner, in the embodiment, there are three possible code values that allow the ink to be discharged if the attribute is the attribute A and the number of discharges of ink is M ($1 \leq M \leq N$ (N=3), and disallow the ink to be discharged if the attribute is the attribute A and the number of discharges of ink is M−1. Among the three possible code values, the pixel assigned the code value "0001" that allows the ink to be discharged if the number of discharges of ink is one (the pixel value is "0001") and disallows the ink to be discharged if the number of discharges of ink is zero (the pixel value is "0000") is also referred to as the first print permitting pixel in the following description. Moreover, among the above-mentioned three possible code values, the pixel assigned the code value "0010" that allows the ink to be discharged if the number of discharges of ink is two (the pixel value is "0010") and disallows the ink to be discharged if the number of discharges of ink is one (the pixel value is "0001") is also referred to as the third print permitting pixel. Furthermore, among the above-mentioned three possible code values, the pixel assigned the code value "0011" that allows the ink to be discharged if the number of discharges of ink is three (the pixel value is "0011") and disallows the ink to be discharged if the number of discharges of ink is two (the pixel value is "0010") is also referred to as the fifth print permitting pixel.

Next, when the code value is "1011," if the attribute of a corresponding pixel is the attribute B and its number of discharges of ink is three, the ink is discharged. On the other hand, if the attribute of a corresponding pixel is the attribute B and its number of discharges of ink is any of zero to two, the ink is not discharged. Furthermore, if the attribute of a corresponding pixel is the attribute A, the ink is not discharged irrespective of the number of discharges of ink. In other words, the code value "1011" allows the ink to be discharged if the pixel value is "1011," but does not allow the ink to be discharged if the pixel value is any of the other values. To put it differently, the code value "1011" corresponds to allowing the discharge of ink once for four possible pixel values ("1000," "1001," "1010," and "1011") if the attribute of a corresponding pixel is the attribute B.

Moreover, when the code value is "1010," if the attribute of a corresponding pixel is the attribute B and its number of discharges of ink is two or three, the ink is discharged. On the other hand, if the attribute of a corresponding pixel is the attribute B and its number of discharges of ink is zero or one, the ink is not discharged. Furthermore, if the attribute of a corresponding pixel is the attribute A, the ink is not discharged irrespective of the number of discharges of ink. In other words, the code value "1010" allows the ink to be discharged if the pixel value is "1011" or "1010," but does not allow the ink to be discharged if the pixel value is any of the other values. To put it differently, the code value "1010" corresponds to allowing the discharge of ink twice for the four possible pixel values if the attribute of a corresponding pixel is the attribute B.

Moreover, when the code value is "1001," if the attribute of a corresponding pixel is the attribute B and its number of discharges of ink is any of one to three, the ink is discharged. On the other hand, if the attribute of a corresponding pixel is the attribute B and its number of discharges of ink is zero, the ink is not discharged. Furthermore, if the attribute of a corresponding pixel is the attribute A, the ink is not discharged irrespective of the number of discharges of ink. In other words, the code value "1001" allows the ink to be discharged if the pixel value is "1011," "1010," or "1001," but does not allow the ink to be discharged if the pixel value is the other value. To put it differently, the code value "1001" corresponds to allowing the discharge of ink three times for the four possible pixel values if the attribute of a corresponding pixel is the attribute B.

In this manner, in the embodiment, there are three possible code values that allow the ink to be discharged if the attribute is the attribute B and the number of discharges of ink is M (1≤M≤N (N=3), and disallow the ink to be discharged if the attribute is the attribute B and the number of discharges of ink is M−1. Among the three possible code values, the pixel assigned the code value "1001" that allows the ink to be discharged if the number of discharges of ink is one (the pixel value is "1001") and disallows the ink to be discharged if the number of discharges of ink is zero (the pixel value is "1000") is also referred to as the second print permitting pixel in the following description. Moreover, among the above-mentioned three possible code values, the pixel assigned the code value "1010" that allows the ink to be discharged if the number of discharges of ink is two (the pixel value is "1010") and disallows the ink to be discharged if the number of discharges of ink is one (the pixel value is "1001") is also referred to as the fourth print permitting pixel. Furthermore, among the above-mentioned three possible code values, the pixel assigned the code value "1011" that allows the ink to be discharged if the number of discharges of ink is three (the pixel value is "1011") and disallows the ink to be discharged if the number of discharges of ink is two (the pixel value is "1010") is also referred to as the sixth print permitting pixel.

Any of the seven code values having the above features is assigned to each pixel based on the following conditions to configure the mask patterns applied in the embodiment. The conditions are described in detail below.

(Condition 1')

Each of the code values "0001," "0010," and "0011" is assigned to three of the 12 pixels that are at the same position in the 12 (K) mask patterns illustrated in FIGS. 11A to 11L (the first, third, and fifth print permitting pixels). Each of the code values "1001," "1010," and "1011" is assigned to another three pixels (the second, fourth, and sixth print permitting pixels). The code value "0000" is assigned to the remaining six (=12−3×2) pixels (the print non-permitting pixels). To put it differently, only one of the 12 pixels corresponding to the same position in the 12 mask patterns illustrated in FIGS. 11A to 11L corresponds to the first print permitting pixel. The same applies to the second, third, fourth, fifth, and sixth print permitting pixels.

For example, the pixel X1 illustrated in FIG. 10 is assigned the code value "0001" in the mask pattern corresponding to the first scan illustrated in FIG. 11A, the code value "0010" in the mask pattern corresponding to the sixth scan illustrated in FIG. 11F, and the code value "0011" in the mask pattern corresponding to the eleventh scan illustrated in FIG. 11K. On the other hand, the pixel X1 is assigned the code value "1001" in the mask pattern corresponding to the eighth scan illustrated in FIG. 11H, the code value "1010" in the mask pattern corresponding to the seventh scan illustrated in FIG. 11G, and the code value "1011" in the mask pattern corresponding to the twelfth scan illustrated in FIG. 11L. The pixel X1 is assigned the code value "0000" in the mask patterns corresponding to the second, third, fourth, fifth, ninth, and tenth scans illustrated respectively in the remaining FIGS. 11B, 11C, 11D, 11E, 11I, and 11J.

To put it differently, the pixel X1 corresponds to the first print permitting pixel in the mask pattern corresponding to the first scan illustrated in FIG. 11A, the third print permitting pixel in the mask pattern corresponding to the sixth scan illustrated in FIG. 11F, and the fifth print permitting pixel in the mask pattern corresponding to the eleventh scan illustrated in FIG. 11K. Moreover, the pixel X1 corresponds to the second print permitting pixel in the mask pattern corresponding to the eighth scan illustrated in FIG. 11H, the fourth print permitting pixel in the mask pattern corresponding to the seventh scan illustrated in FIG. 11G, and the sixth print permitting pixel in the mask pattern corresponding to the twelfth scan illustrated in FIG. 11L. Furthermore, the pixel X1 corresponds to the print non-permitting pixel in the mask patterns corresponding to the second, third, fourth, fifth, ninth, and tenth scans illustrated respectively in FIGS. 11B, 11C, 11D, 11E, 11I, and 11J.

Moreover, the pixel X2 is assigned the code value "0001" in the mask pattern corresponding to the third scan illustrated in FIG. 11C, the code value "0010" in the mask pattern corresponding to the fourth scan illustrated in FIG. 11D, and the code value "0011" in the mask pattern corresponding to the ninth scan illustrated in FIG. 11I. On the other hand, the pixel X2 is assigned the code value "1001" in the mask pattern corresponding to the tenth scan illustrated in FIG. 11J, the code value "1010" in the mask pattern corresponding to the twelfth scan illustrated in FIG. 11L, and the code value "1011" in the mask pattern corresponding to the seventh scan illustrated in FIG. 11G. The pixel X2 is assigned the code value "0000" in the mask patterns corresponding to the first, second, fifth, sixth, eighth, and eleventh scans illustrated respectively in the remaining FIGS. 11A, 11B, 11E, 11F, 11H, and 11K.

To put it differently, the pixel X2 corresponds to the first print permitting pixel in the mask pattern corresponding to the third scan illustrated in FIG. 11C, the third print permitting pixel in the mask pattern corresponding to the fourth scan illustrated in FIG. 11D, and the fifth print permitting pixel in the mask pattern corresponding to the ninth scan illustrated in FIG. 11I. Moreover, the pixel X2 corresponds to the second print permitting pixel in the mask pattern corresponding to the tenth scan illustrated in FIG. 11J, the fourth print permitting pixel in the mask pattern corresponding to the twelfth scan illustrated in FIG. 11L, and the sixth print permitting pixel in the mask pattern corresponding to the seventh scan illustrated in FIG. 11G. Furthermore, the pixel X2 corresponds to the print non-permitting pixel in the mask patterns corresponding to the first, second, fifth, sixth, eighth, and eleventh scans illustrated respectively in FIGS. 11A, 11B, 11E, 11F, 11H, and 11K.

Even if the number of discharges of ink to a given pixel indicated by the two-bit information of image data is any of one to three, such a configuration enables the generation of print data that allows the ink to be discharged the specified number of times to the given pixel.

(Condition 2')

The pixels assigned the code value "0001" (the first print permitting pixels) are placed substantially equally in number in the 12 mask patterns illustrated respectively in FIGS. 11A to 11L. More specifically, only the pixel X1 is assigned the code value "0001" in the mask pattern illustrated in FIG. 11A. Moreover, only the pixel X12 is assigned the code value "0001" in the mask pattern illustrated in FIG. 11B. Similarly, only one pixel is assigned the code value "0001" also in each of the mask patterns illustrated respectively in FIGS. 11C, 11D, 11F, and 11H to 11L. Moreover, two pixels X3 and X7 are assigned the code value "0001" in the mask pattern illustrated in FIG. 11E. No pixel is assigned the code value "0001" in the mask pattern illustrated in FIG. 11G. In this manner, approximately one pixel assigned the code value "0001" is placed equally in each of the mask patterns illustrated in FIGS. 11A to 11L.

Similarly, the pixels assigned the code value "0010" (the third print permitting pixels) are placed substantially equally in number in the mask patterns illustrated respectively in FIGS. 11A to 11L. Furthermore, the pixels assigned the code value "0011" (the fifth print permitting pixels) are placed substantially equally in number in the mask patterns illustrated respectively in FIGS. 11A to 11L.

Consequently, when image data is divided into 12 scans to generate print data using the mask patterns illustrated respectively in FIGS. 11A to 11L, if the attribute of a given pixel indicated by the one-bit information in the image data is the attribute A, the printing rates of the 12 scans can be made substantially equal. For example, if image data where the pixel value of the 12 pixels X1 to X12 is equally "0001" is input, print data is generated which allows the ink to be discharged once in the first to fourth, sixth, and eighth to twelfth scans, allows the ink to be discharged twice in the fifth scan, and never allows the ink to be discharged in the seventh scan. In other words, if the attribute is the attribute A, it is possible to discharge the Pc ink substantially evenly in 12 scans without discharging the ink intensively in specific scans.

(Condition 3')

The pixels assigned the code value "1001" (the second print permitting pixels) are placed such that, of the 12 mask patterns illustrated respectively in FIGS. 11A to 11L, six (J) mask patterns corresponding to the scans of the first half illustrated in FIGS. 11A to 11F hardly include the pixels assigned the code value "1001" (the second print permitting pixels), and six mask patterns corresponding to the scans of the second half illustrated in FIGS. 11G to 11L include the pixels assigned the code value "1001" (the second print permitting pixel) intensively. More specifically, no pixel is assigned the code value "1001" in the mask patterns corresponding to the scans of the first half illustrated in FIGS. 11A to 11F. On the other hand, three pixels, two pixel, two pixels, two pixels, two pixels, and one pixel are assigned the code value "1001" in the mask patterns corresponding to the scans of the second half illustrated in FIGS. 11G, 11H, 11I, 11J, 11K, and 11L, respectively. In this manner, the pixels assigned the code value "1001" (the second print permitting pixels) are placed intensively in the mask patterns corresponding to the scans of the second half among the mask patterns illustrated in FIGS. 11A to 11L.

Similarly, the pixels assigned the code value "1010" (the fourth print permitting pixels) are placed intensively in the mask patterns corresponding to the scans of the second half among the mask patterns illustrated respectively in FIGS. 11A to 11L. Furthermore, the pixels assigned the code value "1011" (the sixth print permitting pixels) are also placed intensively in the mask patterns corresponding to the scans of the second half among the mask patterns illustrated respectively in FIGS. 11A to 11L.

Consequently, when image data is divided into 12 scans to generate print data using the mask patterns illustrated respectively in FIGS. 11A to 11L, if the attribute of a given pixel indicated by the one-bit information in the image data is the attribute B, it is possible to hardly discharge the ink in six scans of the first half of 12 scans and discharge ink intensively in six scans of the second half. For example, if image data where the pixel value of the 12 pixels X1 to X12 is equally "1001" is input, print data is generated such that the ink is never discharged in the first to sixth scans, the ink is discharged three times in the seventh scan, the ink is discharged twice in the eighth to eleventh scans, and the ink is discharged once in the twelfth scan. In other words, it becomes possible to discharge the Pc ink intensively in the scans of the second half if the attribute is the attribute B. Consequently, the application order of the Pc ink can be delayed as compared with the other inks.

In the embodiment, mask patterns such as described above are provided for each ink. Accordingly, it is possible not to especially control the ink application order if the attribute of a given pixel is the attribute A, and to control the ink application order in such a manner as to apply a relatively high density ink first and then a relatively low density ink if the attribute is the attribute B.

Specifically, in the embodiment, mask patterns generated based on the above (condition 1'), (condition 2'), and (condition 3') are used for a relatively low density ink. Consequently, it is possible to discharge the relatively low density ink intensively in the scans of the second half of the plurality of scans if the attribute is the attribute B.

On the other hand, mask patterns generated based on the following (condition 4') in addition to the above (condition 1') and (condition 2') are used for a relatively high density ink.

(Condition 4')

The pixels assigned the code value "1001" (the second print permitting pixels) are placed intensively in the mask patterns corresponding to the scans of the first half. Moreover, the pixels assigned the code value "1010" (the fourth print permitting pixels) are placed intensively in the mask patterns corresponding to the scans of the first half. Furthermore, the pixels assigned the code value "1011" (the sixth print permitting pixels) are also placed intensively in the mask patterns corresponding to the scans of the first half.

The mask patterns generated based on (condition 1'), (condition 2'), and (condition 4') are used. Accordingly, it is possible to discharge a relatively high density ink intensively in the scans of the first half of the plurality of scans if the attribute is the attribute B.

FIGS. 24A to 24L are schematic diagrams illustrating mask patterns M1' to M12' that correspond to the first to twelfth scans and satisfy the above-mentioned (condition 1'), (condition 2'), and (condition 4'). The use of such mask patterns makes it possible to discharge a relatively high density ink (for example, the C ink) intensively in the scans of the first half if the attribute is the attribute B.

The above configuration makes it possible not to especially control the ink application order if the density at a given pixel in an image is relatively low (the attribute A), and to control the ink application order in such a manner as to apply inks in order of a relatively high density ink and a relatively low density ink if the density at a given pixel in the image is relatively high (the attribute B).

A process of generating print data using the mask patterns illustrated in FIGS. 11A to 11L and the decoding table illustrated in FIG. 12 is described in detail below with reference to an example of image data.

FIGS. 13A to 13C are schematic diagrams for explaining an example of image data input in the embodiment.

FIG. 13A illustrates the attributes of the 12 pixels X1 to X12. The pixels X1, X2, X3, X4, X5, and X6 are the attribute A. The pixels X7, X8, X9, X10, X11, and X12 are the attribute B.

Next, FIG. 13B illustrates the numbers of discharges of ink to the 12 pixels X1 to X12. The pixels X1, X4, X7, and X10 are "1." Accordingly, the number of discharges of ink is one. The pixels X2, X5, X8, and X11 are "2." Accordingly, the number of discharges of ink is two. The pixels X3, X6, X9, and X12 are "3." Accordingly, the number of discharges of ink is three.

As described above, in the embodiment, among the four-bit information of the image data, the information related to the attribute corresponds to the fourth bit, and the information related to the number of discharges of ink to the first and second bits. Therefore, if the attributes and the numbers of discharges of ink are those illustrated in FIGS. 13A and 13B, the image data having the pixel values illustrated in FIG. 13C is generated. In other words, the pixel value "0001" is assigned to the pixels X1 and X4, the pixel value "0010" to the pixels X2 and X5, the pixel value "0011" to the pixels X3 and X6, the pixel value "1001" to the pixels X7 and X10, the pixel value "1010" to the pixels X8 and X11, and the pixel value "1011" to the pixels X9 and X12.

FIGS. 14A to 14L are diagrams illustrating print data corresponding to each scan generated by applying a mask pattern that corresponds to the scan and is illustrated in each of FIGS. 11A to 11L, to the image data illustrated in FIG. 13C. In FIGS. 14A to 14L, for the purpose of simplicity, pixels assigned the value of "1" indicating the discharge of ink are illustrated in black. Pixels assigned the value of "0" indicating the non-discharge of ink are illustrated in white.

Figure 14A:
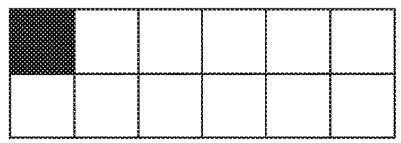
FIGS. 14A to 14L are diagrams illustrating examples of print data generated in an embodiment.

For example, the print data that corresponds to the first scan and is illustrated in FIG. 14A is generated based on the image data illustrated in FIG. 13C, the mask pattern that corresponds to the first scan and is illustrated in FIG. 11A, and the decoding table illustrated in FIG. 12.

Specifically, the pixel value of the pixel X1 in the image data illustrated in FIG. 13C is "0001," and the code value of the pixel X1 in the mask pattern M1 that corresponds to the first scan and is illustrated in FIG. 11A is "0001." Therefore, print data is generated such that the ink is discharged ("1") to the pixel X1 in the first scan by referring to the decoding table illustrated in FIG. 12. On the other hand, the pixel value of the pixel X4 in the image data illustrated in FIG. 13C is "0001," and the code value of the pixel X4 in the mask pattern M1 that corresponds to the first scan and is illustrated in FIG. 11A is "0000." Therefore, print data is generated such that the ink is not discharged ("0") to the pixel X4 in the first scan by referring to the decoding table illustrated in FIG. 12.

As described above, print data is generated which corresponds to each of the 12 scans and is illustrated in each of FIGS. 14A to 14L.

Figure 14G:
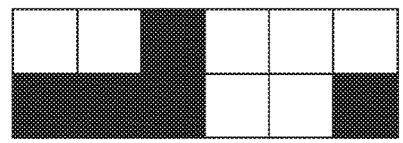
Figure 14B:
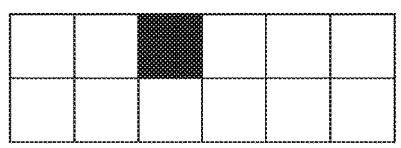
Figure 14H:
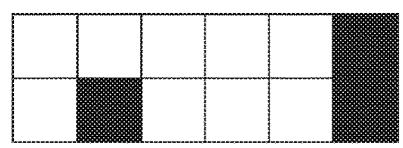
Figure 14C:
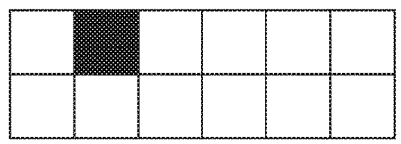
Figure 14I:
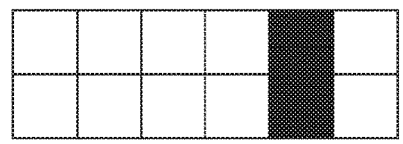
Figure 14D:
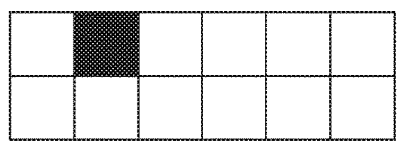
Figure 14J:
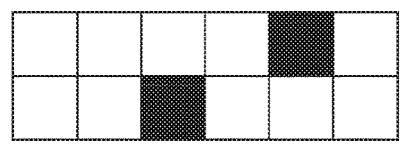
Figure 14E:
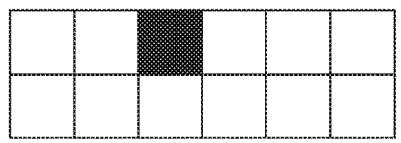
Figure 14K:
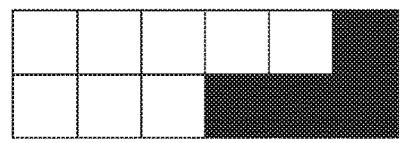
Figure 14F:
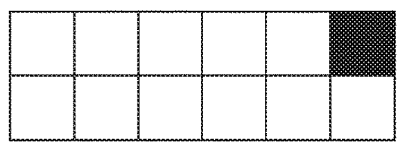
Figure 14L:
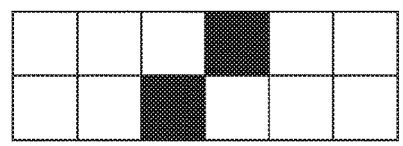

Specifically, FIG. 14A is a diagram of print data of the first pass. Print data is generated which indicates the discharge of ink to X1. Moreover, FIG. 14B is a diagram of print data of the second pass. Print data is generated which indicates the discharge of ink to X3. Moreover, FIG. 14C is a diagram of print data of the third pass. Print data is generated which indicates the discharge of ink to X2. Moreover, FIG. 14D is a diagram of print data of the fourth pass. Print data is generated which indicates the discharge of ink to X2. Moreover, FIG. 14E is a diagram of print data of the fifth pass. Print data is generated which indicates the discharge of ink to X3. Moreover, FIG. 14F is a diagram of print data of the sixth pass. Print data is generated which indicates the discharge of ink to X6. Moreover, FIG. 14G is a diagram of print data of the seventh pass. Print data is generated which indicates the discharge of ink to X3, X7, X8, X9, and X12. Moreover, FIG. 14H is a diagram of print data of the eighth pass. Print data is generated which indicates the discharge of ink to X6, X8, and X12. Moreover, FIG. 14I is a diagram of print data of the ninth pass. Print data is generated which indicates the discharge of ink to X5 and X11. Moreover, FIG. 14J is a diagram of print data of the tenth pass. Print data is generated which indicates the discharge of ink to X5 and X9. Moreover, FIG. 14K is a diagram of print data of the eleventh pass. Print data is generated which indicates the discharge of ink to X6, X10, X11, and X12. Moreover, FIG. 14L is a diagram of print data of the twelfth pass. Print data is generated which indicates the discharge of ink to X4 and X9.

As can be seen from FIGS. 14A to 14L, the ink is discharged approximately the same number of times to the pixels X1, X2, X3, X4, X5, and X6 where the attribute in the image is the attribute A, in the first to twelfth scans. On the other hand, the ink is discharged to the pixels X7, X8, X9, X10, X11, and X12 where the attribute in the image is the attribute B, only in the seventh to twelfth scans of the second half.

As described above, according to the embodiment, it becomes possible not to especially restrict scans in which the ink is discharged if the density in an image is relatively low and its color is bright (the attribute A), and to apply the ink intensively in specific scans if the density in the image is relatively high and its color is dark (the attribute B).

It can be seen from FIGS. 14A to 14L that $(2 \wedge b)$, which is 2 raised to the power of b, possible numbers of discharges of ink can be reproduced at the maximum if b-bit information is used as the information related to the number of discharges of ink as in the embodiment. For example, in the embodiment, b=2 as described above. However, three possible numbers of discharges, one, two, and three, can be reproduced on a pixel by pixel basis. Moreover, it is needless to say that zero discharges can also be reproduced in print data generated if the number of discharges of ink to each pixel, the number being illustrated in FIG. 13B, is zero. It can be seen from the above description that a total of four $(=2 \wedge 2)$ possible numbers of discharges can be reproduced. At the same time, it is also clear that $(2 \wedge b)-1$ (3, if b=2), which is the value obtained by subtracting one from 2 raised to the power of b, numbers of discharges can be reproduced at the maximum.

In the first embodiment described above, the mode has been described in which the Pc ink is discharged approximately the same number of times in each of the plurality of scans if the attribute in an image is the attribute A, and the Pc ink is discharged intensively in the scans of the second half of the plurality of scans if the attribute in the image is the attribute B. However, another mode can also be carried out. For example, it may be a mode in which even if the attribute in an image is the attribute A, the Pc ink is discharged the numbers of times that are unbalanced to some degree among the plurality of scans. Moreover, even if the attribute in the image is the attribute B, the Pc ink may be discharged to some degree from the scans of the first half. Specifically, the difference in the case where the attribute in an image is the attribute A between the number of pixel areas to which the PC ink is discharged in the scans of the second half and the number of pixel areas to which the Pc ink is discharged in the scans of the first half may simply require to be smaller than the difference in the case where the attribute in the image is the attribute B between the number of pixel areas to which the Pc ink is discharged in the scans of the second half and the number of pixel areas to which the Pc ink is discharged in the scans of the first half.

In order to achieve the above control method, mask patterns for the Pc ink are determined such that the difference between the number of pixels placed in the mask patterns corresponding to the scans of the first half and the number of pixels placed in the mask patterns corresponding to the scans of the second half is relatively small among the pixels where the code values ("0001," "0010," and "0011") that allow the ink to be discharged if the attribute in an image is the attribute A and the number of discharges is M and that disallow the ink to be discharged if the attribute in an image is the attribute A and the number of discharges is M−1 are determined. Furthermore, the mask patterns for the Pc ink are to be determined such that the number of pixels placed in the mask patterns corresponding to the scans of the first half is substantially equal to the number of pixels placed in the mask patterns corresponding to the scans of the second half (the difference is approximately zero) among the pixels where the code values are determined.

Moreover, the mask patterns for the Pc ink are to be determined such that the difference between the number of pixels placed in the mask patterns corresponding to the scans of the first half and the number of pixels placed in the mask patterns corresponding to the scans of the second half is relatively large among the pixels where the code values ("1001," "1010," and "1011") that allow the ink to be discharged if the attribute in an image is the attribute B and the number of discharges is M and that disallow the ink to be discharged if the attribute in the image is the attribute B and the number of discharges is M−1 are determined. Furthermore, the mask patterns for the Pc ink are to be determined such that one of the number of pixels placed in the mask patterns corresponding to the scans of the first half and the number of pixels placed in the mask patterns corresponding to the scans of the second half is approximately zero (the difference is approximately a maximum) among the pixels where the code values are determined.

Moreover, in the first embodiment described above, if an image is printed in a unit area in 12 scans, the former part of the scans is set to the first to sixth scans of the first half, and the latter part of the scans to the seventh to twelfth scans of the second half. However, the division of the scans is not limited to this. For example, the former part of the scans may be set to the first to eighth scans, and the latter part of the scans to the ninth to twelfth scans. However, if an image is printed in a unit area in K scans, J scans from the first scan to the J-th scan ($K/2 \leq J \leq (K+1)/2$) are set as the former pat of the scans, and K−J scans from the J+1-th scan to the K-th scan as the latter part of the scans.

Moreover, in the first embodiment, the mode has been described in which $2^{\wedge}b$ possible numbers of discharges of ink are reproduced by the b-bit information related to the number of discharges of ink. However, it may be a mode in which the smaller possible numbers of discharges of ink than $2^{\wedge}b$ is reproduced.

Moreover, in the first embodiment, the mode has been described in which $(2^{\wedge}b)-1$ numbers of discharges of ink are reproduced at the maximum by the b-bit information related to the number of discharges of ink. However, it may be a mode in which the number of discharges equal to or more than $(2^{\wedge}b)-1$ may be reproduced as the maximum number of discharges of ink.

(Second Embodiment)

In the first embodiment, the mode has been described which generates print data that allows ink to be discharged zero to three times to each pixel by using mask patterns having four-bit information per pixel for image data represented by four-bit information including two-bit information including the information related to the number of discharges of ink per pixel.

In contrast, in the embodiment, a mode is described in which an index pattern is used to generate first image data represented on a pixel by pixel basis as three different pieces of two-bit information, the first image data is divided to generate three sets of second image data represented on a pixel by pixel basis as two-bit information, a mask pattern having two-bit information on a pixel by pixel basis is applied to the second image data, and accordingly print data that allows ink to be discharged zero to three times to each pixel is generated.

The description of similar parts to the above-mentioned first embodiment is omitted.

Figure 15:
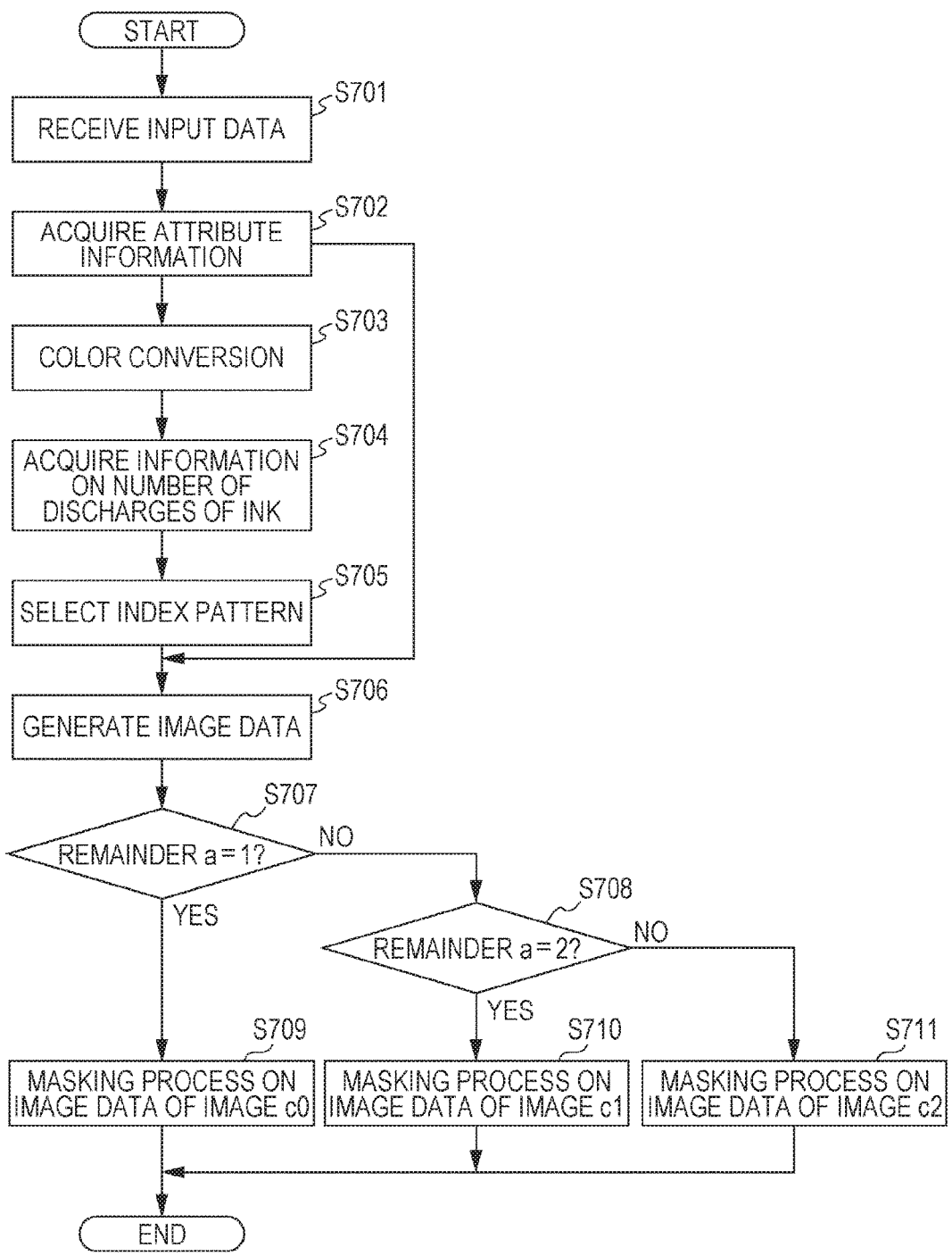
FIG. 15 is a diagram for explaining a process of processing data in an embodiment.

FIG. 15 is a flowchart of a control program that executes RGB data processing in the embodiment.

Processing in Steps S701 to S704 is similar to the processing in Steps S601 to S604 in FIG. 8.

In Step S705, a different index pattern is selected, according to the position of each pixel, from x different index patterns predetermined according to the position of each pixel in a unit area. In the embodiment, x=3. Accordingly, the selection is made from an index pattern I, an index pattern II, and an index pattern III.

Figure 16:
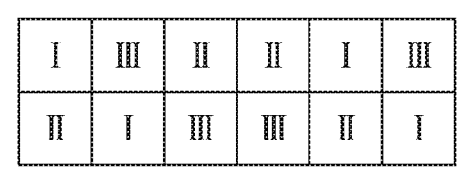

FIG. 16 is a diagram schematically illustrating an index pattern selection table in the embodiment. As can be seen from FIG. 16, in the embodiment, the index pattern I, which is described later, is selected for four pixels X1, X5, X8, and X12. Moreover, the index pattern II, which is described later, is selected for four pixels X3, X4, X7, and X11. Moreover, the index pattern III, which is described later, is selected from four pixels X2, X6, X9, and X10.

FIGS. 17A to 17C are schematic diagrams illustrating index patterns in the embodiment. FIGS. 17A, 17B, and 17C illustrate the index patterns I, II, and III, respectively. In the embodiment, these index patterns are used to develop the two-bit information per pixel, which is related to the number of discharges of ink to one pixel, to one-bit information per pixel, which is related to the number of discharges and the position of the discharge of ink to three pixels (c0, c1, and c2).

Firstly, the index pattern I is described in detail with reference to FIG. 17A. In the index pattern I, if the number of discharges of ink to a given pixel is zero, one-bit information indicating "0" corresponding to the non-discharge of ink is assigned to all the three pixels c0, c1, and c2 corresponding to the given pixel. Moreover, if the number of discharges of ink is one, the one-bit information indicating "0" is assigned to two pixels c1 and c2, and one-bit information indicating "1" indicating the discharge of ink is assigned to the pixel c0. Moreover, if the number of discharges of ink is two, the one-bit information indicating "0" is assigned to the pixel c2, and the one-bit information indicating "1" is assigned to two pixels c0 and c1. Furthermore, if the number of discharges of ink is three, the one-bit information indicating "1" is assigned to all the three pixels c0, c1, and c2.

Next, the index pattern II is described in detail with reference to FIG. 17B. In the index pattern II, if the number of discharges of ink to a given pixel is zero or three, the one-bit information indicating "0" or "1" is assigned as in the index pattern I. On the other hand, if the number of discharges of ink is one, the one-bit information indicating "0" is assigned to two pixels c0 and c2, and the one-bit information indicating "1" that indicates the discharge of ink is assigned to the pixel c1. Moreover, if the number of discharges of ink is two, the one-bit information indicating "0" is assigned to the pixel c0, and the one-bit information indicating "1" is assigned to two pixels c1 and c2.

Next, the index pattern III is described in detail with reference to FIG. 17C. In the index pattern III, if the number of discharges of ink to a given pixel is zero or three, the one-bit information indicating "0" or "1" is assigned as in the index pattern I. On the other hand, if the number of discharges of ink is one, the one-bit information indicating "0" is assigned to two pixels c0 and c1, and the one-bit information indicating "1" that indicates the discharge of ink is assigned to the pixel c2. Moreover, if the number of discharges of ink is two, the one-bit information indicating "0" is assigned to the pixel c1, and the one-bit information indicating "1" is assigned to two pixels c0 and c2.

Next, in Step S706, the first image data that determines the pixel values of a total of 36 pixels, 18 pixels in width and two pixels in length, each of which has two-bit information, is generated based on the information related to the attribute acquired in Step S702, the information related to the number of discharges of ink acquired in Step S704, and the index pattern selected in Step S705. In other words, the index pattern development is performed on data in which the values related to the number of discharges of ink and attribute of the 12 pixels X1 to X12 illustrated in FIG. 10 are determined. Accordingly, the first image data is generated in which the pixel values of the 36 pixels X1c0 to X12c2 schematically illustrated in FIG. 18A.

Among the two-bit information per pixel of the first image data, the first bit is information related to the discharge or non-discharge of ink acquired by the number of discharges of ink and the index pattern, and the second bit is information related to the attribute. For example, if the value of a given pixel indicated by the one-bit information related to the attribute is "1" corresponding to the attribute B, and its value indicated by the information related to the discharge or non-discharge of ink is "0" indicating the non-discharge of ink, the first image data having a pixel value of "10" is generated at the given pixel. Moreover, if the value of a given pixel indicated by the one-bit information related to the attribute is "0" corresponding to the attribute A, and its value indicated by the information related to the discharge or non-discharge of ink is "1" indicating the discharge of ink, the first image data having a pixel value of "01" is generated at the given pixel. Here, the value indicated by the information related to the discharge or non-discharge of ink is assigned to the first bit of the two bits of the first image data, and the value indicated by the information related to the attribute to the second bit. However, the bit number assignment may be different.

Furthermore, in Step S706, the first image data where the pixel values of the 36 pixels X1c0 to X12c2 are determined is divided to generate three sets of second image data, in each of which the pixel values of 12 pixels are determined. More specifically, the first image data illustrated in FIG. 18A is divided into second image data where the pixel values of the pixels X1c0 to X12c0 illustrated in FIG. 18B are determined, second image data where the pixel values of the pixels X1c1 to X12c1 illustrated in FIG. 18C are determined, and second image data where the pixel values of the pixels X1c2 to X12c2 illustrated in FIG. 18D are determined.

In the embodiment, the second image data illustrated in FIG. 18B corresponds to image data used when the value of a is one if, upon generation of print data corresponding to the n-th scan, the result of the division of n by three is m and the remainder is a. Moreover, the second image data illustrated in FIG. 18C corresponds to image data used when the value of a is two. Moreover, the second image data illustrated in FIG. 18D corresponds to image data used when the value of a is zero.

In Step S707, it is determined whether or not the value of the remainder a being the result of the division by three is one. In other words, in the embodiment, scanning is performed 12 times on the unit area. Accordingly, when print data is generated which corresponds to the first, fourth, seventh, and tenth scans where the remainder a being the result of the division by three is one, execution proceeds to Step S709 to perform a masking process described later with the image data illustrated in FIG. 18B.

Moreover, in Step S708, if print data is generated which corresponds to the second, fifth, eighth, and eleventh scans where the remainder a being the result of the division by three is two, execution proceeds to Step S710 to perform the masking process described later with the image data illustrated in FIG. 18C.

Furthermore, if it is determined in Steps S707 and S708 that the remainder a being the result of the division by three is neither one nor two, the remainder is zero. Therefore, if print data is generated which corresponds to the third, sixth, ninth, and twelfth scans where the remainder a is zero, execution proceeds to Step S711 to perform the masking process described later with the image data illustrated in FIG. 18D.

Image information after the index pattern development is divided into three according to the number of passes in this manner. Accordingly, printing can be controlled even over the second image data having two-bit information, considering the number of discharges of ink and the attribute on a pixel by pixel basis.

The masking process performed in the embodiment is described in detail below.

FIGS. 19A to 19L are schematic diagrams illustrating mask patterns to be applied to the image data corresponding to the Pc ink in the embodiment. The mask patterns corresponding to the Pc ink are illustrated here as examples. However, in the embodiment, different mask patterns are provided depending on the ink.

Moreover, FIG. 20 is a diagram illustrating a decoding table applied in the embodiment.

As described above, in the embodiment, printing is performed on the unit area in a total of 12 scans. FIGS. 19A to 19L illustrate mask patterns N1 to N12 corresponding to the first to twelfth scans, respectively.

A code value indicated by two-bit information is assigned to each pixel in the mask patterns illustrated in FIGS. 19A to 19L. Specifically, any of three code values "00," "01," and "11" is assigned to each pixel.

The code values are described in detail below with reference to the decoding table illustrated in FIG. 20.

As can be seen from FIG. 20, when the code value is "00," the non-discharge of ink is determined ("0") irrespective of a pixel value in the image data. In other words, the pixel whose code value "00" is determined in a mask pattern never discharges the ink. In the embodiment, the pixel whose code value "00" is assigned in a mask pattern is referred to as the print non-permitting pixel.

Next, when the code value is "01," if the attribute of a corresponding pixel is the attribute A and the discharge of ink is indicated ("1"), the ink is allowed to be discharged. On the other hand, if the attribute of a corresponding pixel is the attribute A and the non-discharge of ink is indicated ("0"), the ink is not discharged. Furthermore, if the attribute of a corresponding pixel is the attribute B, the ink is not discharged irrespective of the discharge or non-discharge of the ink. In other words, the code value "01" allows the ink to be discharged if the pixel value is "01," but does not allow the ink to be discharged if the pixel value is any of the other values. To put it differently, the code value "01" corresponds to allowing the discharge of ink once for two possible pixel values ("00" and "01") (the allowable number of discharges of ink is one) only if the attribute of a corresponding pixel is the attribute A. In the embodiment, the pixel in a mask pattern assigned the code value "01" where the ink may be allowed to be discharged if the attribute is the attribute A is referred to as the first print permitting pixel.

Next, when the code value is "11," if the attribute of a corresponding pixel is the attribute B and the discharge of ink is indicated ("1"), the ink is allowed to be discharged. On the other hand, if the attribute of a corresponding pixel is the attribute B and the non-discharge of ink is indicated, the ink is not discharged. Furthermore, if the attribute of a corresponding pixel is the attribute A, the ink is not discharged irrespective of the discharge or non-discharge of ink. In other words, the code value "11" allows the ink to be discharged if the pixel value is "11," but does not allow the ink to be discharged if the pixel value is any of the other values. To put it differently, the code value "11" corresponds to allowing the discharge of ink once for two possible pixel values ("10" and "11") (the allowable number of discharges of ink is one) only if the attribute of a corresponding pixel is the attribute B. In the embodiment, the pixel in a mask pattern assigned the code value "11" where the ink may be allowed to be discharged if the attribute is the attribute B is referred to as the second print permitting pixel.

The mask patterns applied in the embodiment are configured by assigning any of the three code values having the above features to each pixel based on the following conditions. The conditions are described in detail below.

(Condition 1")

The 12 (K) mask patterns illustrated in FIGS. 19A to 19L are divided into three mask pattern groups each including four (=12/3) (K/x) mask patterns. Specifically, let the result of the division of the number of scans n corresponding to each mask pattern by three be m, and let the remainder be a. The mask patterns are classified into the different mask pattern groups depending on the values of a: 1, 2, and 0. In other words, a first mask pattern group includes the mask patterns N1, N4, N7, and N10 illustrated in FIGS. 19A, 19D, 19G, and 19J corresponding to the first, fourth, seventh, and tenth scans where the above-mentioned remainder a is one. Moreover, a second mask pattern group includes the mask patterns N2, N5, N8, and N11 illustrated in FIGS. 19B, 19E, 19H, and 19K corresponding to the second, fifth, eighth, and eleventh scans where the remainder a is two. A third mask pattern group includes the mask patterns N3, N6, N9, and N12 illustrated in FIGS. 19C, 19F, 19I, and 19L corresponding to the third, sixth, ninth, and twelfth scans where the remainder a is zero.

The four mask patterns belonging to the first mask pattern group are applied associated with the same image data schematically illustrated in FIG. 18B in the above-mentioned Step S709. Hence, the code value "01" is assigned to one of four pixels that are at the same position in the four mask patterns illustrated in the mask patterns N1, N4, N7, and N10 illustrated in FIGS. 19A, 19D, 19G, and 19J (the first print permitting pixel). The code value "11" is assigned to another pixel (the second print permitting pixel). The code value "00" is assigned to the remaining two (=4−1×2) pixels (the print non-permitting pixels).

For example, in terms of the pixel X1c0 illustrated in FIG. 18B, the code value "01" is assigned in the mask pattern corresponding to the tenth scan illustrated in FIG. 19J. On the other hand, the code value "11" is assigned in the mask pattern corresponding to the seventh scan illustrated in FIG. 19G. The code value "00" is assigned in the mask patterns corresponding to the first and fourth scans illustrated respectively in the remaining FIGS. 19A and 19D. To put it differently, the pixel X1c0 is the first print permitting pixel in the mask pattern corresponding to the tenth scan illustrated in FIG. 19J, is the second print permitting pixel in the mask pattern corresponding to the seventh scan illustrated in FIG. 19G, and is the print non-permitting pixel in the mask patterns corresponding to the first and fourth scans illustrated respectively in FIGS. 19A and 19D.

Moreover, in terms of the pixel X12c0, the code value "01" is assigned in the mask pattern corresponding to the fourth scan illustrated in FIG. 19D. On the other hand, the code value "11" is assigned in the mask pattern corresponding to the tenth scan illustrated in FIG. 19J. The code value "00" is assigned in the mask patterns corresponding to the first and seventh scans illustrated respectively in the remaining FIGS. 19A and 19G. To put it differently, the pixel X12c0 is the first print permitting pixel in the mask pattern corresponding to the fourth scan illustrated in FIG. 19D, is the second print permitting pixel in the mask pattern corresponding to the tenth scan illustrated in FIG. 19J, and is the print non-permitting pixel in the mask patterns corresponding to the first and seventh scans illustrated respectively in FIGS. 19A and 19G.

Moreover, the four mask patterns belonging to the second mask pattern group are applied associated with the same image data schematically illustrated in FIG. 18C in the above-mentioned Step S710. Hence, as in the first mask pattern group, the code value "01" is assigned to one of four pixels that are at the same position in the four mask patterns illustrated in the mask patterns N2, N5, N8, and N11 illustrated in FIGS. 19B, 19E, 19H, and 19K (the first print permitting pixel). The code value "11" is assigned to another pixel (the second print permitting pixel). The code value "00" is assigned to the remaining two pixels (the print non-permitting pixels).

Furthermore, the four mask patterns belonging to the third mask pattern group are applied associated with the same image data schematically illustrated in FIG. 18D in the above-mentioned Step S711. Hence, as in the first and second mask pattern groups, the code value "01" is assigned to one of four pixels that are at the same position in the four mask patterns illustrated in the mask patterns N3, N6, N9, and N12 illustrated in FIGS. 19C, 19F, 19I, and 19L (the first print permitting pixel). The code value "11" is assigned to another pixel (the second print permitting pixel). The code value "00" is assigned to the remaining two pixels (the print non-permitting pixels).

Mask patterns and index patterns such as described above are used. Accordingly, as in the first embodiment, even if the number of discharges of ink to a given pixel is any of one to three, print data can be generated which allows ink to be discharged the specified number of times to the given pixel.

(Condition 2")

The pixels assigned the code value "01" are placed substantially equally in number in the 12 mask patterns illustrated respectively in FIGS. 19A to 19L. More specifically, the code value "01" is assigned to three pixels X3c0, X7c0, and X11c0 corresponding respectively to the pixels X3, X7, and X11 in the mask pattern illustrated in FIG. 19A. Moreover, the code value "01" is assigned to three pixels X1c1, X5c1, and X9c1 corresponding respectively to the pixels X1, X5, and X9 in the mask pattern illustrated in FIG. 19B. In this manner, it is clear that approximately three pixels assigned the code value "01" are placed equally in each of the mask patterns illustrated in FIGS. 19A to 19L.

Consequently, when image data is divided into 12 scans to generate print data using the mask patterns illustrated respectively in FIGS. 19A to 19L, if the attribute of a given pixel indicated by one-bit information in the image data is the attribute A, the printing rates can be made substantially equal in the 12 scans. In other words, it is possible to discharge the Pc ink substantially equally in the 12 scans without discharging the ink intensively in specific scans if the attribute is the attribute A.

(Condition 3")

The pixels assigned the code value "11" are placed in the 12 mask patterns illustrated respectively in FIGS. 19A to 19L such that six (J) mask patterns corresponding to the scans of the first half illustrated in FIGS. 19A to 19F hardly include the pixels assigned the code value "11," and six mask patterns corresponding to the scans of the second half illustrated in FIGS. 19G to 19L include the pixels assigned the code value "11" intensively. More specifically, the code value "11" is assigned to no pixel in the mask patterns corresponding to the scans of the first half illustrated in FIGS. 19A to 19F. On the other hand, the code value "11" is assigned to six pixels, seven pixels, five pixels, six pixels, five pixels, and seven pixels respectively in the mask patterns corresponding to the scans of the second half illustrated in FIGS. 19G, 19H, 19I, 19J, 19K, and 19L. In this manner, it is clear that the pixels assigned the code value "11" are placed intensively in the mask patterns corresponding to the scans of the second half among the mask patterns illustrated in FIGS. 19A to 19L.

Consequently, when image data is divided into 12 scans to generate print data using the mask patterns illustrated respectively in FIGS. 19A to 19L, if the attribute of a given pixel indicated by one-bit information in the image data is the attribute B, it is possible to hardly discharge the ink in six scans of the first half of the 12 scans, and to discharge the ink intensively in six scans of the second half. In other words, it becomes possible to discharge the Pc ink intensively in the scans of the second half if the attribute is the attribute B. Consequently, the application order of the Pc ink can be delayed as compared to the other inks.

In the embodiment, mask patterns such as described above are provided for each ink. Accordingly, it is possible not to especially control the ink application order if the attribute of a given pixel is the attribute A and to control the ink application order in such a manner as to apply a relatively high density ink first and then a relatively low density ink if the attribute is the attribute B.

Specifically, in the embodiment, mask patterns generated based on the above (condition 1"), (condition 2"), and (condition 3") are used for a relatively low density ink. Consequently, a relatively low density ink can be discharged intensively in scans of the second half of a plurality of scans if the attribute is the attribute B.

On the other hand, mask patterns generated based on the following (condition 4") in addition to the above (condition 1") and (condition 2") are used for a relatively high density ink.

(Condition 4")

The pixels assigned the code value "11" are placed intensively in the mask patterns corresponding to the scans of the first half.

The mask patterns generated based on (condition 1") (condition 2"), and (condition 4") are used. Accordingly, it is possible to discharge a relatively high density ink intensively in the scans of the first half of the plurality of scans if the attribute is the attribute B. In terms of the index pattern, a substantially similar index pattern to the one illustrated in FIG. 16 can be applied to the other inks.

FIGS. 25A to 25L are schematic diagrams illustrating mask patterns N1' to N12' that correspond to the first to twelfth scans and satisfy the above-mentioned (condition 1"), (condition 2"), and (condition 4"). Such mask patterns are used. Accordingly, in terms of a relatively high density ink (for example, the C ink), it becomes possible to discharge the ink intensively in the scans of the first half if the attribute is the attribute B.

As in the first embodiment, the above configuration makes it possible not to especially control the ink application order if the density at a given pixel in an image is relatively low (the attribute A), and to control the ink application order in such a manner as to apply inks in order of a relatively high density ink and a relatively low density ink if the density at a given pixel in the image is relatively high (the attribute B).

A process of generating print data using the mask patterns illustrated in FIGS. 19A to 19L, the decoding table illustrated in FIG. 20, and the index patterns illustrated in FIGS. 16 and 17A to 17C is described in detail below with reference to examples of image data.

FIGS. 21A to 21F are schematic diagrams for explaining examples of image data input in the embodiment.

Figures 21A, 21B, 21C, 21D, 21E, 21F:
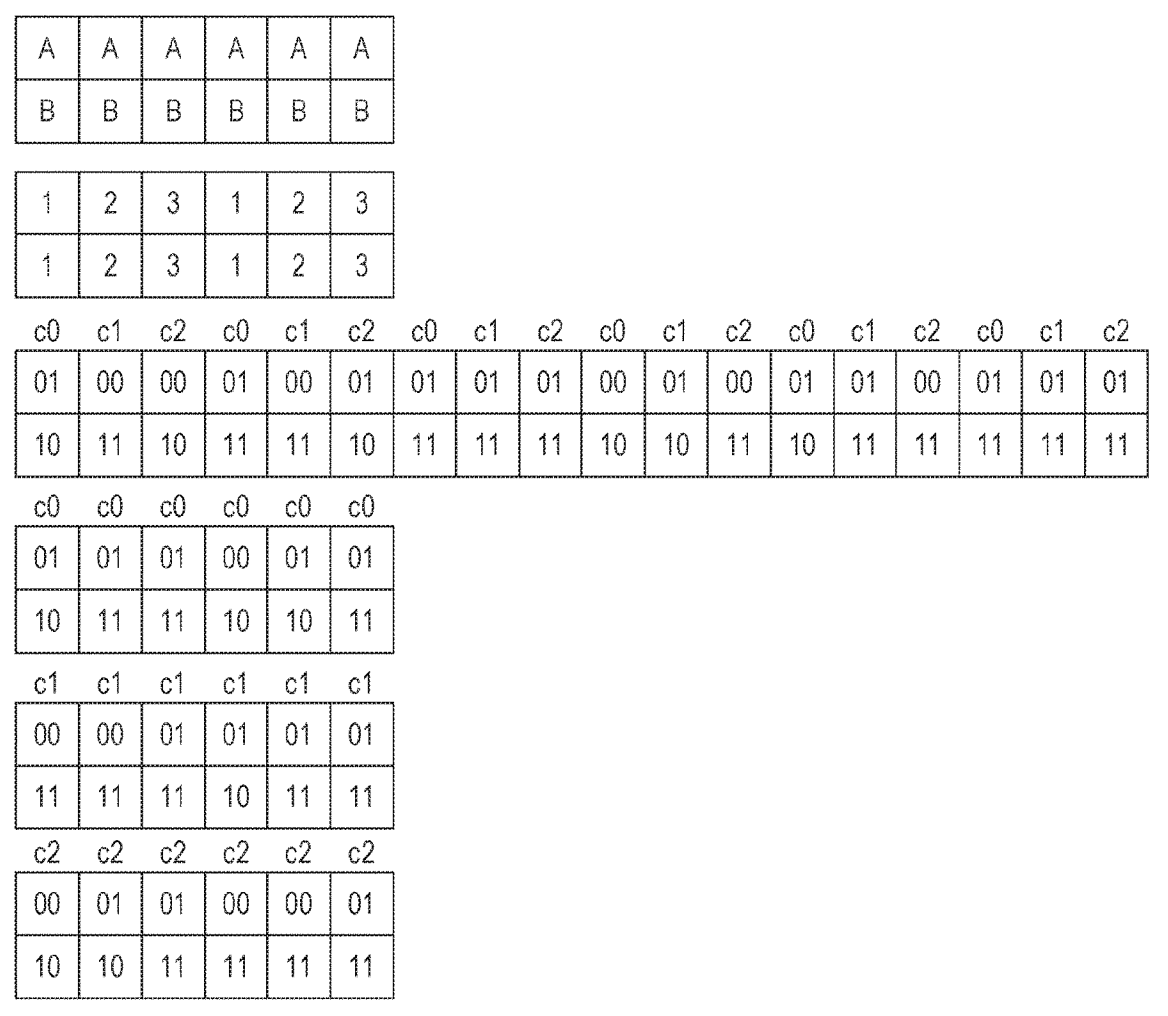

FIG. 21A illustrates the attributes of the 12 pixels X1 to X12. The pixels X1, X2, X3, X4, X5, and X6 are the attribute A, and the pixels X7, X8, X9, X10, X11, and X12 are the attribute B.

Next, FIG. 21B illustrates the numbers of discharges of ink to the 12 pixels X1 to X12. The pixels X1, X4, X7, and X10 are "1," and accordingly their number of discharges of ink is one. The pixels X2, X5, X8, and X11 are "2," and accordingly their number of discharges of ink is two. The pixels X3, X6, X9, and X12 are "3," and accordingly their number of discharges of ink is three.

The attributes and numbers of discharges of ink that are illustrated in FIGS. 21A and 21B are the same as the attributes and numbers of discharges of ink that are illustrated in FIGS. 13A and 13B and used in the first embodiment.

Next, as described above, the index pattern development is performed with the information related to the attribute illustrated in FIG. 21A, the information related to the number of discharges of ink illustrated in FIG. 21B, and the index pattern illustrated in FIGS. 16 and 17A to 17C. First image data illustrated in FIG. 21C is then generated.

For example, the attribute of the pixel X1 is the attribute A as can be seen from FIG. 21A. Accordingly, the second bit of the two-bit information in the image data is "0." Moreover, at the pixel X1, the index pattern to be selected is the index pattern I as can be seen from FIG. 16, and the number of discharges of ink is one as can be seen from FIG. 21B. Therefore, the index pattern development is performed using the index pattern illustrated in FIG. 17A. Consequently, the pixel values "01," "00," and "00" are respectively assigned to the pixels X1c0, X1c1, and X1c2 corresponding to the pixel X1 as can be seen from FIG. 21C.

Moreover, the attribute of the pixel X7 is the attribute B as can be seen from FIG. 21A. The second bit of the two-bit information in the image data is "1." Moreover, as the pixel X7, the index pattern to be selected is the index pattern II as can be seen from FIG. 16, and the number of discharges of ink is one as can be seen from FIG. 21B. Therefore, the index pattern development is performed using the index pattern illustrated in FIG. 17B. Consequently, the pixel values "10," "11," and "10" are respectively assigned to the pixels X7c0, X7c1, and X7c2 corresponding to the pixel X7 as can be seen from FIG. 21C.

Next, the first image data generated in the above-mentioned manner is divided to generate second image data where pixel values of the pixels X1c0 to X12c0 such as illustrated in FIG. 21D are determined, and second image data where pixel values of the pixels X1c1 to X12c1 such as illustrated in FIG. 21E are determined, and second image data where pixel values of the pixels X1c2 to X12c2 such as illustrated in FIG. 21F are determined.

Next, in Step S709, the mask patterns that correspond to the first, fourth, seventh, and tenth scans and are illustrated in FIGS. 19A, 19D, 19G, and 19J are applied to the second image data illustrated in FIG. 21D. Accordingly, print data used in the first, fourth, seventh, and tenth scans is generated.

Moreover, in Step S710, the mask patterns that correspond to the second, fifth, eighth, and eleventh scans and are illustrated in FIGS. 19B, 19E, 19H, and 19K are applied to the second image data illustrated in FIG. 21E. Accordingly, print data used in the second, fifth, eighth, and eleventh scans is generated.

Furthermore, in Step S711, the mask patterns that correspond to the third, sixth, ninth, and twelfth scans and are illustrated in FIGS. 19C, 19F, 19I, and 19L are applied to the second image data illustrated in FIG. 21F. Accordingly, print data used in the third, sixth, ninth, and twelfth scans is generated.

FIGS. 22A to 22L are diagrams illustrating print data that corresponds to each scan and is generated by applying a mask pattern corresponding to the scan illustrated in each of FIGS. 19A to 19L to the second image data illustrated in each of FIGS. 21D to 21F. For the purpose of simplicity, in FIGS. 22A to 22L, pixels assigned the value "1" indicating the discharge of ink are illustrated in black, and pixels assigned the value "0" indicating the non-discharge of ink are illustrated in white.

Figure 22A:
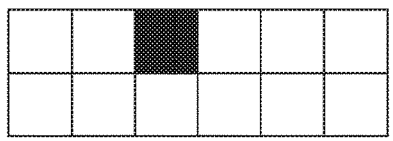
FIGS. 22A to 22L are diagrams illustrating examples of print data generated in an embodiment.

For example, the print data that corresponds to the first scan and is illustrated in FIG. 22A is generated based on the image data illustrated in FIG. 21D, the mask pattern that corresponds to the first scan and is illustrated in FIG. 19A, and the decoding table illustrated in FIG. 20.

Specifically, the pixel value of the pixel X1c0 illustrated in FIG. 21A in the image data is "01." The code value of the pixel X1 illustrated in FIG. 19A in the mask pattern N1 corresponding to the first scan is "00." Therefore, print data is generated such that the ink is not discharged ("0") to the pixel X1 in the first scan as illustrated in FIG. 22A, with reference to the decoding table illustrated in FIG. 20. On the other hand, the pixel value of the pixel X3c0 illustrated in FIG. 21D in the image data is "01." The code value of the pixel X3 illustrated in FIG. 19A in the mask pattern N1 corresponding to the first scan is "01." Therefore, print data is generated such that the ink is discharged ("1") to the pixel X3 in the first scan as illustrated in FIG. 22A, with reference to the decoding table illustrated in FIG. 20.

As described above, the print data that corresponds to each of the 12 scans and is illustrated in each of FIGS. 22A to 22L is generated.

Figure 22B:
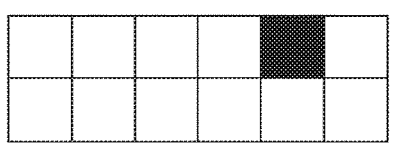
Figure 22C:
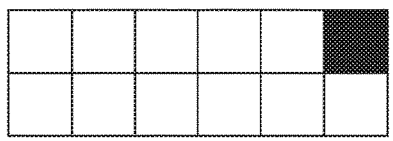
Figure 22D:
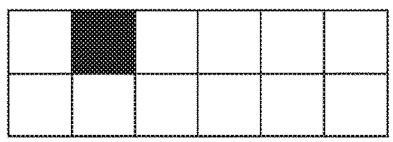
Figure 22E:
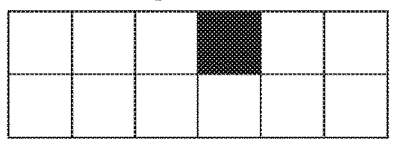
Figure 22F:
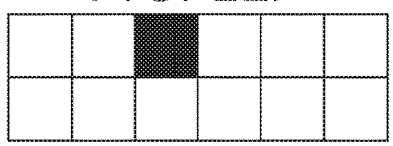
Figure 22G:
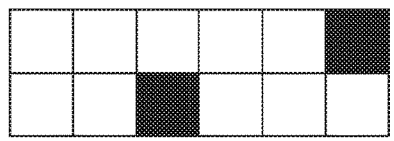
Figure 22H:
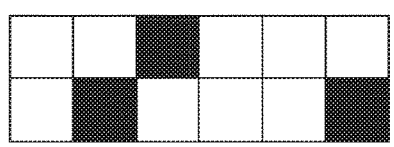
Figure 22I:
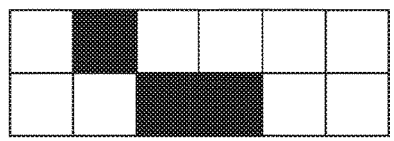
Figure 22J:
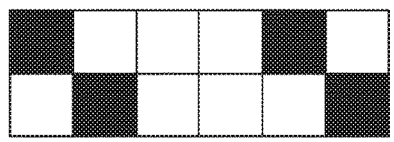
Figure 22K:
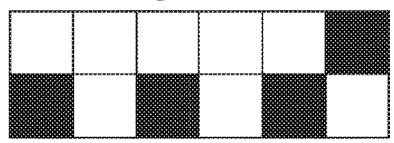
Figure 22L:
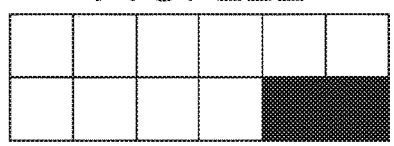

Specifically, FIG. 22A is a diagram of print data of the first pass. Print data is generated which indicates the discharge of ink to the pixel X3. Moreover, FIG. 22B is a diagram of print data of the second pass. Print data is generated which indicates the discharge of ink to the pixel X5. Moreover, FIG. 22C is a diagram of print data of the third pass. Print data is generated which indicates the discharge of ink to the pixel X6. Moreover, FIG. 22D is a diagram of print data of the fourth pass. Print data is generated which indicates the discharge of ink to the pixel X2. Moreover, FIG. 22E is a diagram of print data of the fifth pass. Print data is generated which indicates the discharge of ink to the pixel X4. Moreover, FIG. 22F is a diagram of print data of the sixth pass. Print data is generated which indicates the discharge of ink to the pixel X3. Moreover, FIG. 22G is a diagram of print data of the seventh pass. Print data is generated which indicates the discharge of ink to the pixels X6 and X9. Moreover, FIG. 22H is a diagram of print data of the eighth pass. Print data is generated which indicates the discharge of ink to the pixels X3, X8, and X12. Moreover, FIG. 22I is a diagram of print data of the ninth pass. Print data is generated which indicates the discharge of ink to the pixels X2, X9, and X10. Moreover, FIG. 22J is a diagram of print data of the tenth pass. Print data is generated which indicates the discharge of ink to the pixels X1, X5, X8, and X12. Moreover, FIG. 22K is a diagram of print data of the eleventh pass. Print data is generated which indicates the discharge of ink to the pixels X6, X7, X9, and X11. Moreover, FIG. 22L is a diagram of print data of the twelfth pass. Print data is generated which indicates the discharge of ink to the pixels X11 and X12.

As can be seen from FIGS. 22A to 22L, the ink is discharged to the pixels X1, X2, X3, X4, X5, and X6 where the attribute in the image is the attribute A approximately the same number of times in the first to twelfth scans. On the other hand, the ink is discharged to the pixels X7, X8, X9, X10, X11, and X12 where the attribute in the image is the attribute B only in the seventh to twelfth scans of the second half.

As described above, also according to the embodiment, it becomes possible not to especially restrict scans in which ink is discharged if the density in an image is relatively low (the attribute A), and to apply ink intensively in specific scans if the density in the image is relatively high (the attribute B).

It can be seen from FIGS. 22A to 22L that if x different index patterns are provided, x+1 possible numbers of discharges of ink can be reproduced at the maximum. For example, in the embodiment, x=3 as described above. Three possible numbers of discharges per pixel, 1, 2, and 3, can be reproduced. Moreover, it is needless to say that if the number of discharges of ink to each pixel, which is illustrated in FIG. 21B, is zero, the number of discharges, zero, can also be reproduced in print data generated. From the above description, it can be seen that four (=3+1) possible numbers of discharges in total can be reproduced. At the same time, it is also clear that x (three if x=3) numbers of discharges can be reproduced at the maximum.

In the second embodiment described above, the mode has been described in which the Pc ink is discharged approximately the same number of times in a plurality of scans if the attribute in an image is the attribute A, and the Pc ink is discharged intensively in scans of the second half of the plurality of scans if the attribute in the image is the attribute B. However, another mode can also be carried out. For example, it may be a mode in which even if the attribute in an image is the attribute A, the Pc ink is discharged the numbers of times that are unbalanced to some degree in the plurality of scans. Moreover, even if the attribute in the image is the attribute B, the PC ink may be discharged to some degree from the scans of the first half. Specifically, it may simply require that the difference in the case where the attribute in an image is the attribute A between the number of pixel areas to which the Pc ink is discharged in the scans of the second half and the number of pixel areas to which the Pc ink is discharged in the scans of the first half is larger than the difference in the case where the attribute in the image is the attribute B between the number of pixel areas to which the Pc ink is discharged in the scans of the second half and the number of pixel areas to which the Pc ink is discharged in the scans of the first half.

Moreover, in the second embodiment described above, if an image is printed in a unit area in 12 scans, the former part of the scans is set to the first to six scans of the first half, and the latter part of the scans to the seventh to twelfth scans of the second half. However, the division of the scans is not limited to this. For example, the former part of the scans may be set to the first to eighth scans, and the latter part of the scans to the ninth to twelfth scans. However, if an image is printed in a unit area in K scans, J scans from the first scan to the J-th scan ($K/2 \leq J \leq (K+1)/2$) are set as the former pat of the scans, and K−J scans from the J+1-th scan to the K-th scan as the latter part of the scans.

Moreover, in the second embodiment, the mode has been described in which x+1 possible numbers of discharges of ink are reproduced by x sets of second image data generated using x index patterns. However, it may be a mode in which the numbers of discharges of ink smaller than x+1 are reproduced.

Moreover, in the second embodiment, the mode has been described in which x numbers of discharges of ink are reproduced at the maximum by x sets of second image data generated using x index patterns. However, it may be a mode in which the number of discharges equal to or more than x may be reproduced as the maximum number of discharges of ink.

(Third Embodiment)

In the first and second embodiments, the mode has been described in which printing is performed on a unit area on a print medium in a plurality of print scans.

In contrast, in the embodiment, a plurality of print heads that correspond respectively to inks and have a length corresponding to an entire length in a width direction (a Z direction) of a print medium is used to control a plurality of ink discharge orders in a printing apparatus that performs printing by performing one relative print scan between the print head and the print medium.

The description of similar parts to the above-mentioned first and second embodiments is omitted.

Figure 23:
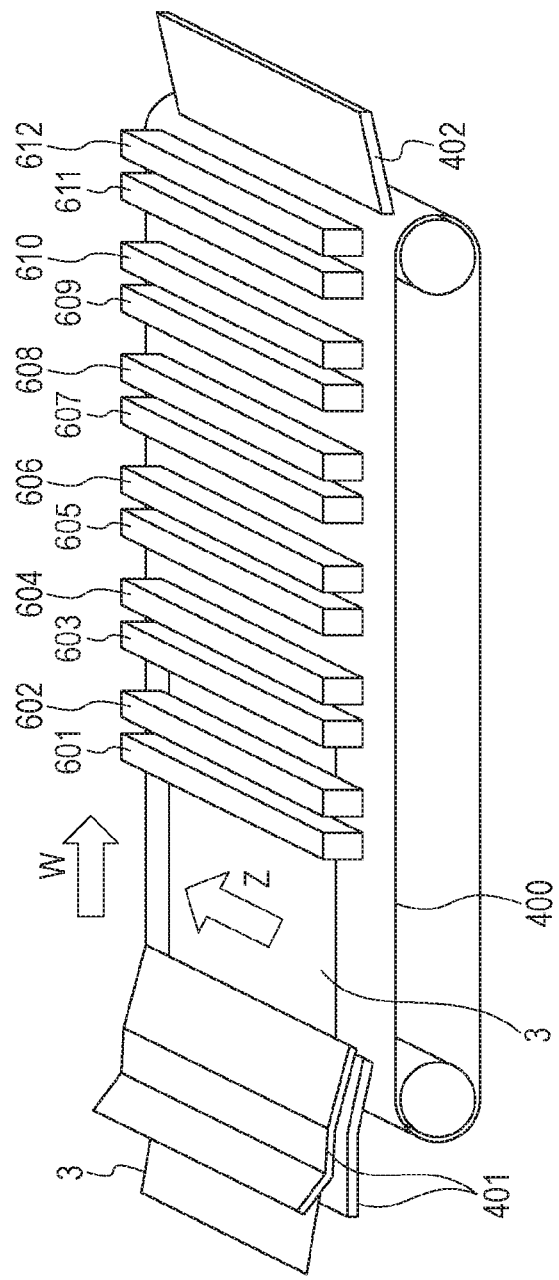
FIG. 23 is a perspective view of an image printing apparatus applied in an embodiment.

FIG. 23 is a side view partially illustrating an internal configuration of an image printing apparatus according to the embodiment.

Each of 12 print heads (nozzle array groups) 601 to 612 includes a predetermined number of nozzles (unillustrated) that discharge inks of yellow (Y), magenta (M), photo magenta (Pm), cyan (C), photo cyan (Pc), black (Bk), gray (Gy), photo gray (Pgy), red (R), blue (B), and processing liquid (P) arranged in the Z direction. Hence, a total of 12 nozzle arrays that each discharge one color ink is arranged in each of the print heads 601 to 612. The length in the Z direction of the nozzle array is equal to or more than the length in the Z direction of the print medium 3 to enable printing throughout the Z direction on the print medium 3. These print heads 601 to 612 are placed side by side in a W direction intersecting the Z direction. The 12 print heads 601 to 612 are also collectively referred to as the printing unit. Moreover, photo cyan is in substantially the same hue as cyan and is a color that is lower in density than cyan. Similarly, photo magenta and photo gray are in substantially the same hues as magenta and gray, respectively, and are colors that are lower in density than magenta and gray, respectively.

A conveyance belt 400 is a belt that conveys the print medium 3. Moreover, the conveyance belt 400 is rotated in the W direction by a feeding unit 401 and a discharging unit 402.

The print medium 3 is fed by the feeding unit 401 and conveyed in the W direction by the conveyance belt 400.

In the image printing apparatus, an image can be completed in one print scan. Accordingly, it becomes possible to achieve a reduction in print time.

In the embodiment, the mask patterns illustrated in FIGS. 11A to 11L are applied respectively to the 12 nozzle arrays that discharge the Pc ink in the print heads 601 to 612 illustrated in FIG. 23. Consequently, print data can be generated such that if the attribute in an image is the attribute A, substantially the same amount of the Pc ink is discharged from the 12 nozzle arrays in the print heads 601 to 612. On the other hand, print data can be generated that if the attribute in the image is the attribute B, the Pc ink is discharged intensively from six nozzle arrays in the print heads 607 to 612 placed downstream in the W direction.

The mask patterns that are illustrated in FIGS. 11A to 11L and described in the first embodiment are applied here. However, it is also possible to apply the mask patterns that are illustrated in FIGS. 19A to 19L and described in the second embodiment to the 12 nozzle arrays that discharge the Pc ink in the print heads 601 to 612.

Moreover, the length in the Z direction of the nozzle array, which is used in the embodiment, is a length corresponding to the width of a print medium. However, it is also possible to use what is called a connected head extended by arranging a plurality of short nozzle arrays in the Z direction, as a print head.

Moreover, in the embodiments described above, the mode has been described which restricts the application order in such a manner as to apply a relatively high density ink first and then a relatively low density ink if the density in an image is high, and not to especially restrict the application order for a relatively high density ink and a relatively low density ink if the density in the image is low. However, another mode can also be carried out. In other words, the present invention can be applied as long as it is a mode that switches between the case of restricting the ink application order between two kinds of inks and the case of no special restriction on a predetermined condition. For example, the present invention can be applied even to a mode in which the processing liquid ink without a coloring material is used, the application order is restricted such that the processing liquid ink is applied before a colored ink in high-quality print mode that focuses on image quality, and the application order for the processing liquid ink and the colored ink is not especially restricted in high-speed print mode that focuses on print speed. In this case, it may require that if a user selects the high-speed print mode, the attribute in an image is determined to be the attribute A and, if the user selects the high-quality print mode, the attribute in an image is determined to be the attribute B.

Moreover, in the embodiments described above, the mode has been described which executes the control according to the present invention in both of two kinds of inks: a relatively high density ink and a relatively low density ink. However, the control according to the present invention may be executed only in one of them. In this case, the mask pattern is applied in the other ink, switched according to the print condition (attribute) as described in Japanese Patent Application Laid-open No. 2010-000666. Also in such a mode, the present invention's effect of reductions in memory capacity and processing load of a control unit can be obtained in one of the inks to which the embodiment is applied.

Moreover, the embodiments describe what is called a thermal jet type inkjet printing apparatus and printing method that discharge ink with the energy of bubble generation caused by heating. However, the present invention is not limited to the thermal jet type inkjet printing apparatus. The present invention can be effectively applied to various image printing apparatuses such as what is called a piezoelectric inkjet printing apparatus that discharges ink using a piezoelectric element.

Moreover, the embodiments describe the image printing method using the image printing apparatus. However, the present invention can also be applied to a mode in which an image processing apparatus, image processing method, or program that generates data for performing the image printing method described in the embodiments is prepared separately from the image printing apparatus. Moreover, it is needless to say that the present invention can also be widely applied to a mode of being included in part of the image printing apparatus.

Moreover, "print medium" not only includes paper used in a general printing apparatus but also widely includes those that can accept ink such as fabric, plastic films, metal sheets, glass, ceramic, wood, and leather.

Furthermore, "ink" should be widely interpreted similarly to the definition of the above "print medium." In other words, "ink" used in the embodiment represents liquid that can be supplied for the formation of an image, design, pattern, and the like or processing of a print medium, or the processing of ink (for example, the coagulation or insolubilization of a coloring material in the ink to be applied to a print medium), by being applied onto a print medium.

According to an image processing apparatus and an image processing method according to the present invention, it becomes possible to perform printing, controlling the ink application order in accordance with the print condition while preventing increases in capacity of memory and processing load of a control unit even if ink is discharged more than once to one pixel area.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-034515, filed Feb. 24, 2015, which is hereby incorporated by reference herein in its entirety.

What is claimed is:

1. An image processing apparatus for generating print data used in each of K relative scans performed on a unit area on a print medium by a print head for discharging ink, the print data determining discharge or non-discharge of ink to each pixel area corresponding to a plurality of pixels in the unit area, the image processing apparatus comprising:
   one or more processors; and
   one or more computer-readable media coupled to the one or more processors, the one or more computer-readable media storing instructions that, when executed by the one or more processors, cause an image processing device to perform operations comprising:
   a first acquiring step to acquire image data that corresponds to an image to be printed in the unit area and that determines an attribute of each of the plurality of pixels in the image, and a number of discharges of ink from zero to N (N≥2) to each of the plurality of pixels; and
   a generating step to generate the print data based on the image data acquired by the first acquiring step, and K mask patterns that correspond to the K scans and that determine allowing or disallowing ink to be discharged in accordance with the attribute and number of discharges indicated at each of the plurality of pixels by the image data,
   wherein first print permitting pixels and second print permitting pixels are placed in the K mask patterns such that (i) a difference between a number of the first print permitting pixels placed in J (1<J <K) mask patterns corresponding to J scans from the first scan to the J-th scan among the K scans and the number of the first print permitting pixels placed in K−J mask pattern corresponding to K−J scans from the J +1-th scan to a K-th scan among the K scans is a first value, and (ii) a difference between a number of the second print permitting pixels placed in the J mask patterns corresponding to the J scans and the number of the second print permitting pixels placed in the K−J mask patterns corresponding to the K−J scans is a second value larger than the first value, the first print permitting pixels allowing ink to be discharged when the attribute is a first attribute and the number of discharges is M (1≤M≤N), the attribute and number of discharges being indicated by the image data, and disallowing ink to be discharged when the attribute is the first attribute and the number of discharges is M−1, the attribute and number of discharges being indicated by the image data, the second print permitting pixels allowing ink to be discharged when the attribute is a second attribute different from the first attribute and the number of discharges is M, the attribute and number of discharges being indicated by the image data, and disallowing ink to be discharged when the attribute is the second attribute and the number of discharges is M−1, the attribute and number of discharges being indicated by the image data, and wherein the print head is able to discharge an ink of a first color and an ink of a second color different from the first color, the first acquiring step acquires first image data corresponding to the first color ink, and second image data corresponding to the second color ink, and the generating step (i) generates the print data corresponding to the first color ink used in the K scans based on the first image data acquired by the first acquiring step and first K mask patterns corresponding to the first color ink, and (ii) generates the print data corresponding to the second color ink used in the K scans based on the second image data acquired by the first acquiring step, and second K mask patterns corresponding to the second color ink.

2. The image processing apparatus according to claim 1, wherein the first print permitting pixels are placed in the K mask patterns such that the number of the first print permitting pixels placed in the J mask patterns corresponding to the J scans and the number of the first print permitting pixels placed in the K−J mask patterns corresponding to the K−J scans are equal.

3. The image processing apparatus according to claim 1, wherein the second print permitting pixels are placed in the K mask patterns such that one of the number of the second print permitting pixels placed in the J mask patterns corresponding to the J scans and the number of the second print permitting pixels placed in the K−J mask patterns corresponding to the K−J scans is zero.

4. The image processing apparatus according to claim 1, wherein the first print permitting pixel allows ink to be discharged when the attribute is the first attribute and the number of discharges is equal to or more than M, the attribute and number of discharges being indicated by the image data, and disallows ink to be discharged when the attribute is the first attribute and the number of discharges is equal to or less than M−1, the attribute and number of discharges being indicated by the image data, and the second print permitting pixel allows ink to be discharged when the attribute is the second attribute and the number of discharges is equal to or more than M, the attribute and number of discharges being indicated by the image data, and disallows ink to be discharged when the attribute is the second attribute and the number of discharges is equal to or less than M−1, the attribute and number of discharges being indicated by the image data.

5. The image processing apparatus according to claim 1, wherein

M <N, and third print permitting pixels and fourth print permitting pixels are further placed in the K mask patterns such that (i) a difference between a number of the third print permitting pixels placed in the J mask patterns corresponding to the J scans and the number of the third print permitting pixels placed in the K−J mask patterns corresponding to the K−J scans is a third value, and (ii) a difference between a number of the fourth print permitting pixels placed in the J mask patterns corresponding to the J scans and the number of the fourth print permitting pixels placed in the K−J mask patterns corresponding to the K−J scans is a fourth value larger than the third value, the third print permitting pixels allowing ink to be discharged when an attribute is a first attribute and the number of discharges is M +1, the attribute and number of discharges being indicated by the image data, and disallowing ink to be discharged when the attribute is the first attribute and the number of discharges is M, the attribute and number of discharges being indicated by the image data, the fourth print permitting pixels allowing ink to be discharged when the attribute is a second attribute and the number of discharges is M +1, the attribute and number of discharges being indicated by the image data, and disallowing ink to be discharged when the attribute is the second attribute and the number of discharges is M, the attribute and number of discharges being indicated by the image data.

6. The image processing apparatus according to claim 5, wherein of K pixels corresponding to the same position in the K mask patterns, only one pixel corresponds to the first print permitting pixel, only one pixel corresponds to the second print permitting pixel, only one pixel corresponds to the third print permitting pixel, and only one pixel corresponds to the fourth print permitting pixel.

7. The image processing apparatus according to claim 1, further comprising:

a second acquiring step to acquire RGB data of the image to be printed in the unit area;

a conversing step to convert the RGB data acquired by the second acquisition unit to generate grayscale data corresponding to an ink color;

a third acquiring step to quantize the grayscale data converted by the conversion unit to acquire information related to the number of discharges of ink to each of the plurality of pixels; and a fourth acquiring step to acquire information related to an attribute of each of the plurality of pixels in the image, wherein the first acquiring step acquires the image data based on the information related to the number of discharges of ink to each of the plurality of pixels, the information having been acquired by the third acquiring step, and the information related to the attribute of each of the plurality of pixels in the image, the information having been acquired by the fourth acquiring step.

8. The image processing apparatus according to claim 7, further comprising a fifth acquiring step to acquire information related to density in the image, wherein the fourth acquiring step (i) acquires information related to a first attribute as the attribute in the image when the density in the image indicated by the information acquired by the fifth acquiring step is a first density, and (ii) acquires information related to a second attribute as the attribute in the image when the density in the image indicated by the information acquired by the fifth acquiring step is a second density higher than the first density.

9. The image processing apparatus according to claim 8, wherein the fifth acquiring step acquires the information related to the density in the image based on the RGB data acquired by the second acquiring step.

10. The image processing apparatus according to claim 1, wherein
in the first K mask patterns, the number of the second print permitting pixels placed in J first mask patterns corresponding to the J scans is larger than the number of the second print permitting pixels placed in K–J first mask patterns corresponding to the K–J scans, and
in the second K mask patterns, the number of the second print permitting pixels placed in J second mask patterns corresponding to the J scans is smaller than the number of the second print permitting pixels placed in K–J second mask patterns corresponding to the K–J scans.

11. The image processing apparatus according to claim 10, wherein the second color ink is an ink lower in density than the first color ink.

12. The image processing apparatus according to claim 11, wherein the second color ink is in the same hue as the first color ink.

13. The image processing apparatus according to claim 1, wherein $K/2 \leq J \leq (K+1)/2$.

14. The image processing apparatus according to claim 1, wherein
the image data is represented by c-bit ($c \geq a+b$) information at least including a-bit ($a \geq 1$) information related to the attribute and b-bit ($b \geq 1$) information related to the number of discharges, on a pixel by pixel basis, and
each of the K mask patterns is represented by c-bit information at least including a-bit information corresponding to the a-bit information in the image data and being related to the attribute, and b-bit information corresponding to the b-bit information in the image data and being related to an allowable number of discharges of ink, on a pixel by pixel basis.

15. The image processing apparatus according to claim 14, wherein the generating step uses a table that determines discharge or non-discharge of ink to each pixel to generate the print data in accordance with the a-bit information and b-bit information indicated by the image data, and the a-bit information and b-bit information indicated by each of the K mask patterns.

16. The image processing apparatus according to claim 1, further comprising the print head.

17. An image processing apparatus for generating print data used in each of K relative scans performed on a unit area on a print medium by a print head for discharging ink, the print data determining discharge or non-discharge of ink to each pixel area corresponding to a plurality of pixels in the unit area, the image processing apparatus comprising:
one or more processors; and
one or more computer-readable media coupled to the one or more processors, the one or more computer-readable media storing instructions that, when executed by the one or more processors, cause an image processing device to perform operations comprising:
a first acquiring step to acquire image data that corresponds to an image to be printed in the unit area and that determines an attribute of each of the plurality of pixels in the image and a number of discharges of ink from zero to N ($N \geq 2$) to each of the plurality of pixels; and
a generating step to generate the print data based on the image data acquired by the first acquiring step, and K mask patterns that correspond to the K scans of the unit area and that determine the attribute of each of the plurality of pixels in the image and an allowable number of discharges of ink from zero to N to each of the plurality of pixels,
wherein first print permitting pixels whose attribute is a first attribute and allowable number of discharges is M ($1 \leq M \leq N$), and second print permitting pixels whose attribute is a second attribute different from the first attribute and allowable number of discharges is M are placed in the K mask patterns such that (i) a difference between the number of the first print permitting pixels placed in J ($1 < J < K$) mask patterns corresponding to J scans from the first scan to the J-th scan among the K scans and the number of the first print permitting pixels placed in K–J mask patterns corresponding to K–J scans from the J+1-th scan to the K-th scan among the K scans is a first value, and (ii) a difference between a number of the second print permitting pixels placed in the J mask patterns corresponding to the J scans and the number of the second print permitting pixels placed in the K–J mask patterns corresponding to the K–J scans is a second value larger than the first value, and
wherein the print head is able to discharge an ink of a first color and an ink of a second color different from the first color,
the first acquiring step acquires first image data corresponding to the first color ink, and second image data corresponding to the second color ink, and
the generating step (i) generates the print data corresponding to the first color ink used in the K scans based on the first image data acquired by the first acquiring step and first K mask patterns corresponding to the first color ink, and (ii) generates the print data corresponding to the second color ink used in the K scans based on the second image data acquired by the first acquiring step, and second K mask patterns corresponding to the second color ink.

18. An image processing apparatus for generating print data used in each of K relative scans performed on a unit area on a print medium by a print head for discharging ink, the print data determining discharge or non-discharge of ink to each pixel area corresponding to a plurality of pixels in the unit area, the image processing apparatus comprising:
a first acquisition unit configured to acquire x image data sets that correspond to an image to be printed in the unit area and that determine an attribute of each of the plurality of pixels in the image and discharge or non-discharge of ink to each of the plurality of pixels; and
a generation unit configured to generate the print data based on the x image data sets acquired by the first acquisition unit, and K mask patterns that correspond to the K scans of the unit area and that determine allowing or disallowing ink to be discharged in accordance with the attribute and discharge or non-discharge indicated at each of the plurality of pixels by the image data, wherein first print permitting pixels allowing ink to be discharged when the attribute indicated by the image data is a first attribute, and second print permitting pixels allowing ink to be discharged when the attribute indicated by the image data is a second attribute different from the first attribute are placed in the K mask patterns such that (i) a difference between a number of the first print permitting pixels placed in J (1<J <K) mask patterns corresponding to J scans from the first scan to the J-th scan among the K scans and the number of the first print permitting pixels placed in K−J mask patterns corresponding to K−J scans from the J +1-th scan to the K-th scan among the K scans is a first value, and (ii) a difference between a number of the second print permitting pixels placed in the J mask patterns corresponding to the J scans and the number of the second print permitting pixels placed in the K−J mask patterns corresponding to the K−J scans is a second value larger than the first value, and the generation unit generates the print data by using x mask pattern groups formed by dividing the K mask patterns, to each of which K/x mask patterns belong, associating the x mask pattern groups with the x image data sets acquired by the first acquisition unit.

19. The image processing apparatus according to claim 18, wherein the first print permitting pixels are placed in the K mask patterns such that the number of the first print permitting pixels placed in the J mask patterns corresponding to the J scans is equal to the number of the first print permitting pixels placed in the K−J mask patterns corresponding to the K−J scans.

20. The image processing apparatus according to claim 18, wherein the second print permitting pixels are placed in the K mask patterns such that one of the number of the second print permitting pixels placed in the J mask patterns corresponding to the J scans and the number of the second print permitting pixels placed in the K−J mask patterns corresponding to the K−J scans is zero.

21. The image processing apparatus according to claim 18, wherein of K/x pixels corresponding to the same position in the K/x mask patterns belonging to the same mask pattern group among the K mask patterns, only one pixel corresponds to the first print permitting pixel, and only one pixel corresponds to the second print permitting pixel.

22. The image processing apparatus according to claim 18, further comprising:
a second acquisition unit configured to acquire RGB data of the image to be printed in the unit area;
a conversion unit configured to convert the RGB data acquired by the second acquisition unit to generate grayscale data corresponding to an ink color;
a third acquisition unit configured to quantize the grayscale data converted by the conversion unit to acquire information related to the number of discharges of ink to each of the plurality of pixels; and
a fourth acquisition unit configured to acquire information related to the attribute of each of the plurality of pixels in the image, wherein
the first acquisition unit acquires the image data based on the information related to the number of discharges of ink to each of the plurality of pixel, the information having been acquired by the third acquisition unit, and the information related to the attribute of each of the plurality of pixels in the image, the information having been acquired by the fourth acquisition unit.

23. The image processing apparatus according to claim 22, further comprising a fifth acquisition unit configured to acquire information related to density in the image, wherein the fourth acquisition unit (i) acquires information related to the first attribute as the attribute in the image when the density in the image indicated by the information acquired by the fifth acquisition unit is a first density, and (ii) acquires information related to the second attribute as the attribute in the image when the density in the image indicated by the information acquired by the fifth acquisition unit is a second density higher than the first density.

24. The image processing apparatus according to claim 23, wherein the fifth acquisition unit acquires the information related to the density in the image based on the RGB data acquired by the second acquisition unit.

25. The image processing apparatus according to claim 18, wherein the first acquisition unit uses an index pattern determined according to the number of discharges of ink to develop the information acquired by the third acquisition unit to x different pieces of information per pixel, and acquires the x image data sets.

26. The image processing apparatus according to claim 18, wherein
the print head is able to discharge an ink of a first color and an ink of a second color different from the first color,
the first acquisition unit acquires first x image data sets corresponding to the first color ink, and second x image data sets corresponding to the second color ink, and
the generation unit (i) generates the print data corresponding to the first color ink used in the K scans based on the first x image data sets acquired by the first acquisition unit and first K mask patterns corresponding to the first color ink, and (ii) generates the print data corresponding to the second color ink used in the K scans based on the second x image data sets acquired by the first acquisition unit, and second K mask patterns corresponding to the second color ink.

27. The image processing apparatus according to claim 26, wherein
in the first K mask patterns, the number of the second print permitting pixels placed in the J first mask patterns corresponding to the J scans is larger than the number of the second print permitting pixels placed in the K−J first mask patterns corresponding to the K−J scans, and
in the second K mask patterns, the number of the second print permitting pixels placed in the J second mask patterns corresponding to the J scans is smaller than the number of the second print permitting pixels placed in K−J second mask patterns corresponding to the K−J scans.

28. The image processing apparatus according to claim 27, wherein the second color ink is an ink lower in density than the first color ink.

29. The image processing apparatus according to claim 28, wherein the second color ink is in the same hue as the first color ink.

30. The image processing apparatus according to claim 18, wherein $K/2 \leq J \leq (K+1)/2$.

31. The image processing apparatus according to claim 18, wherein the x image data sets are represented by c-bit ($c \geq a +1$) information at least including a-bit ($a \geq 1$) information related to the attribute and one-bit information related to discharge or non-discharge of ink, on a pixel by pixel basis, and
each of the K mask patterns is represented by c-bit information at least including a-bit information corresponding to the a-bit information of the x image data sets and being related to the attribute, and one-bit information corresponding to the one-bit information of the x image data sets and being related to allowing or disallowing ink to be discharged, on a pixel by pixel basis.

32. The image processing apparatus according to claim 31, wherein the generation unit uses a table that determines discharge or non-discharge of ink to each pixel to generate the print data in accordance with the a-bit information and one-bit information indicated by the x image data sets, and the a-bit information and one-bit information indicated by each of the K mask patterns.

33. The image processing apparatus according to claim 27, further comprising the print head.

34. An image processing method for generating print data used in each of K relative scans performed on a unit area on a print medium by a print head for discharging ink, the print data determining discharge or non-discharge of ink to each pixel area corresponding to a plurality of pixels in the unit area, the image processing method comprising:
acquiring image data that corresponds to an image to be printed in the unit area and that determines an attribute of each of the plurality of pixels in the image and a number of discharges of ink from zero to N (N≥1) to each of the plurality of pixels; and
generating the print data based on the image data acquired, and K mask patterns that correspond to the K scans of the unit area and that determine allowing or disallowing ink to be discharged in accordance with the attribute and number of discharges indicated at each of the plurality of pixels by the image data, wherein
first print permitting pixels and second print permitting pixels are placed in the K mask patterns such that (i) a difference between a number of the first print permitting pixels placed in J (1<J <K) mask patterns corresponding to J scans from the first scan to the J-th scan among the K scans and the number of the first print permitting pixels placed in K–J mask patterns corresponding to K–J scans from the J +1-th scan to the K-th scan among the K scans is a first value, and (ii) a difference between a number of the second print permitting pixels placed in the J mask patterns corresponding to the J scans and the number of the second print permitting pixels placed in the K–J mask patterns corresponding to the K–J scans is a second value larger than the first value, the first print permitting pixels allowing ink to be discharged when the attribute is a first attribute and the number of discharges is M (1≤M≤N), the attribute and number of discharges being indicated by the image data, and disallowing ink to be discharged when the attribute is the first attribute and the number of discharges is M–1 , the attribute and number of discharges being indicated by the image data, the second print permitting pixels allowing ink to be discharged when the attribute is a second attribute different from the first attribute and the number of discharges is M, the attribute and number of discharges being indicated by the image data, and disallowing ink to be discharged when the attribute is the second attribute and the number of discharges is M–1 , the attribute and number of discharges being indicated by the image data,
wherein the print head is able to discharge an ink of a first color and an ink of a second color different from the first color,
the first acquiring acquires first image data corresponding to the first color ink, and second image data corresponding to the second color ink, and
the generating (i) generates the print data corresponding to the first color ink used in the K scans based on the first image data acquired by the first acquiring step and first K mask patterns corresponding to the first color ink, and (ii) generates the print data corresponding to the second color ink used in the K scans based on the second image data acquired by the first acquiring step, and second K mask patterns corresponding to the second color ink.

35. An image processing method for generating print data used in each of K relative scans performed on a unit area on a print medium by a print head for discharging ink, the print data determining discharge or non-discharge of ink to each pixel area corresponding to a plurality of pixels in the unit area, the image processing method comprising:
acquiring x sets of image data that is first image data corresponding to an image to be printed in the unit area and that determines an attribute of each of the plurality of pixels in the image and discharge or non-discharge of ink to each of the plurality of pixels; and
generating the print data based on the x image data sets acquired, and K mask patterns that correspond to the K scans of the unit area and that determine allowing or disallowing ink to be discharged in accordance with the attribute and discharge or non-discharge indicated at each of the plurality of pixels by the image data, wherein
first print permitting pixels and second print permitting pixels are placed in the K mask patterns such that (i) a difference between a number of the first print permitting pixels placed in J (1<J <K) mask patterns corresponding to J scans from the first scan to the J-th scan among the K scans and the number of the first print permitting pixels placed in K–J mask patterns corresponding to K–J scans from the J +1-th scan to the K-th scan among the K scans is a first value, and (ii) a difference between a number of the second print permitting pixels placed in the J mask patterns corresponding to the J scans and the number of the second print permitting pixels placed in the K–J mask patterns corresponding to the K–J scans is a second value larger than the first value, the first print permitting pixels allowing ink to be discharged when the attribute indicated by the image data is a first attribute, the second print permitting pixels allowing ink to be discharged when the attribute indicated by the image data is a second attribute different from the first attribute, and
the print data is generated by using x mask pattern groups formed by dividing the K mask patterns, to each of which K/x mask patterns belong, associating the x mask pattern groups with the x image data sets acquired.

36. An image processing apparatus for generating print data used in each of K relative scans performed on a unit area on a print medium by a print head for discharging ink, the print data determining discharge or non-discharge of ink to each pixel area corresponding to a plurality of pixels in the unit area, the image processing apparatus comprising:
the print head;
a first acquisition unit configured to acquire image data that corresponds to an image to be printed in the unit area and that determines an attribute of each of the plurality of pixels in the image, and a number of discharges of ink from zero to N (N≥2) to each of the plurality of pixels; and
a generation unit configured to generate the print data based on the image data acquired by the first acquisition unit, and K mask patterns that correspond to the K scans and that determine allowing or disallowing ink to be discharged in accordance with the attribute and number of discharges indicated at each of the plurality of pixels by the image data,
wherein first print permitting pixels and second print permitting pixels are placed in the K mask patterns such that (i) a difference between a number of the first print permitting pixels placed in J ($1<J<K$) mask patterns corresponding to J scans from the first scan to the J-th scan among the K scans and the number of the first print permitting pixels placed in K−J mask pattern corresponding to K−J scans from the J+1-th scan to a K-th scan among the K scans is a first value, and (ii) a difference between a number of the second print permitting pixels placed in the J mask patterns corresponding to the J scans and the number of the second print permitting pixels placed in the K−J mask patterns corresponding to the K−J scans is a second value larger than the first value, the first print permitting pixels allowing ink to be discharged when the attribute is a first attribute and the number of discharges is M ($1 \leq M \leq N$), the attribute and number of discharges being indicated by the image data, and disallowing ink to be discharged when the attribute is the first attribute and the number of discharges is M−1, the attribute and number of discharges being indicated by the image data, the second print permitting pixels allowing ink to be discharged when the attribute is a second attribute different from the first attribute and the number of discharges is M, the attribute and number of discharges being indicated by the image data, and disallowing ink to be discharged when the attribute is the second attribute and the number of discharges is M−1, the attribute and number of discharges being indicated by the image data.

* * * * *